United States Patent
Davison et al.

(10) Patent No.: US 6,665,264 B1
(45) Date of Patent: Dec. 16, 2003

(54) CONNECTION ADMISSION CONTROL FOR CONNECTION ORIENTATED NETWORKS

(75) Inventors: Robert G Davison, Ipswich (GB); Manoochehr Azmoodeh, Ipswich (GB); Willem P Dijkstra, Groningen (NL)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/202,505

(22) PCT Filed: Aug. 24, 1998

(86) PCT No.: PCT/GB98/02540

§ 371 (c)(1),
(2), (4) Date: Dec. 16, 1998

(87) PCT Pub. No.: WO99/12379

PCT Pub. Date: Mar. 11, 1999

(30) Foreign Application Priority Data

Aug. 28, 1997 (GB) ................................................ 9718269

(51) Int. Cl.[7] .......................... H04L 12/26; H04L 12/56
(52) U.S. Cl. ..................... 370/230; 370/235; 370/395.2
(58) Field of Search ................................. 370/229, 230, 370/231, 232, 233, 234, 235, 395, 468, 230.1, 395.1, 395.2, 395.21, 395.5, 395.41, 395.43

(56) References Cited

U.S. PATENT DOCUMENTS

| | | | | |
|---|---|---|---|---|
| 5,432,790 A | * | 7/1995 | Hluchyj et al. | 370/412 |
| 5,953,338 A | * | 9/1999 | Ma et al. | 370/395 |
| 5,982,748 A | * | 11/1999 | Yin et al. | 370/232 |
| 6,084,955 A | * | 7/2000 | Key et al. | 379/220 |

FOREIGN PATENT DOCUMENTS

| | | | |
|---|---|---|---|
| EP | 0651537 A2 | * | 5/1995 |
| EP | 0785652 A1 | * | 7/1997 |
| WO | WO 95/17061 | | 6/1995 |

OTHER PUBLICATIONS

"Self-sizing Network Operation Systems in ATM Networks", Nakagawa et al., IEEE Network Operations and Management Symposium, Kyoto, Apr. 15–19, 1996.*

"A Connection Admission Control Algorithm Based on Empirical Traffic Measurements", Cheng et al., Proceedings of the Conference on Communications, Seattle, Jun. 18–22, 1995.*

PCT International Search Report, PCT/GB98/02540, dated Nov. 23, 1998, 4 pages.*

P B Key, "Connection Admission Control In ATM Networks", BT Technology Journal,, vol. 13, No. 3, Jul. 1995, pp. 52–66.

Guerin et al. , "Equivalent Capacity And Its Application To Bandwidth Allocation In High–Speed Networks", IEEE Journal on Selected Areas in Communications, vol. 9, No. 7, Sep. 1991, pp. 968–980.

* cited by examiner

Primary Examiner—Chau Nguyen
Assistant Examiner—Soon-Dong Hyun
(74) Attorney, Agent, or Firm—Nixon & Vanderhye P.C.

(57) ABSTRACT

An asynchronous transfer mode (ATM) switch (12) in an ATM network is provided with a connection admission control function which is periodically modified in a predetermined manner in dependence on a measurement of bandwidth utilization of the ATM switch (12) over an interval encompassing a number of call connections. The ATM switch (12) implements an effective bandwidth type connection admission control function which bestows an amount of bandwidth to each of a number of connection types which are supported. One or more higher layer connection admission control functions are provided which are responsive to traffic fluctuations to modify effective bandwidths for connection types stored by the ATM switch in a predetermined manner.

36 Claims, 16 Drawing Sheets

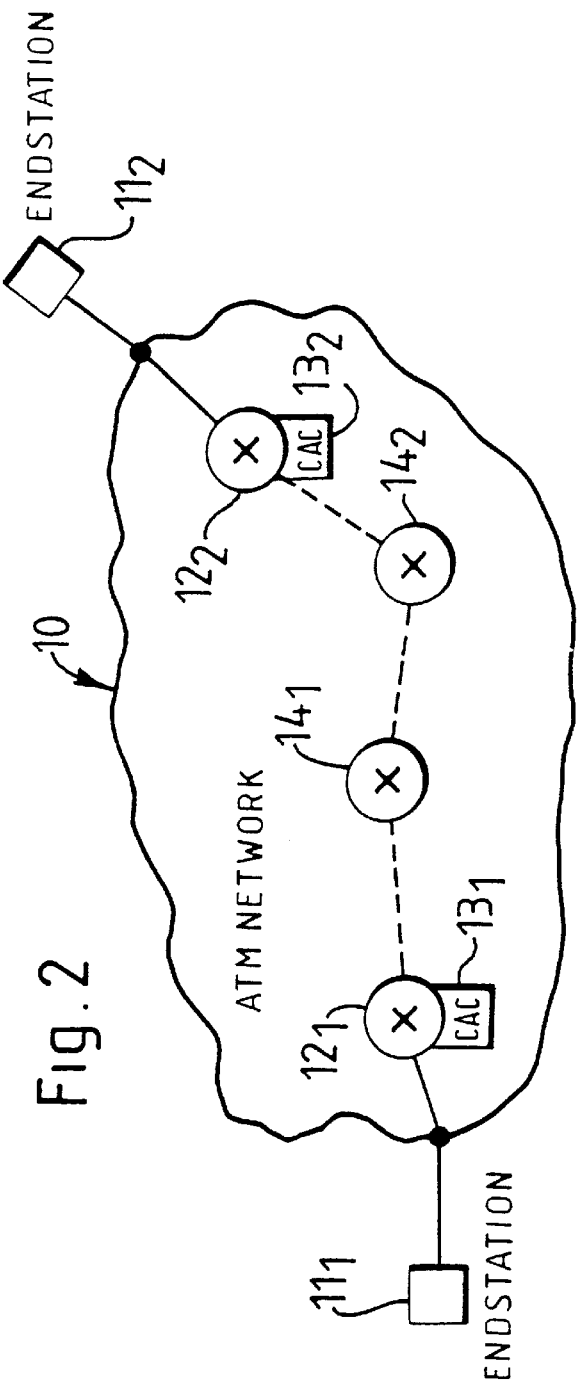
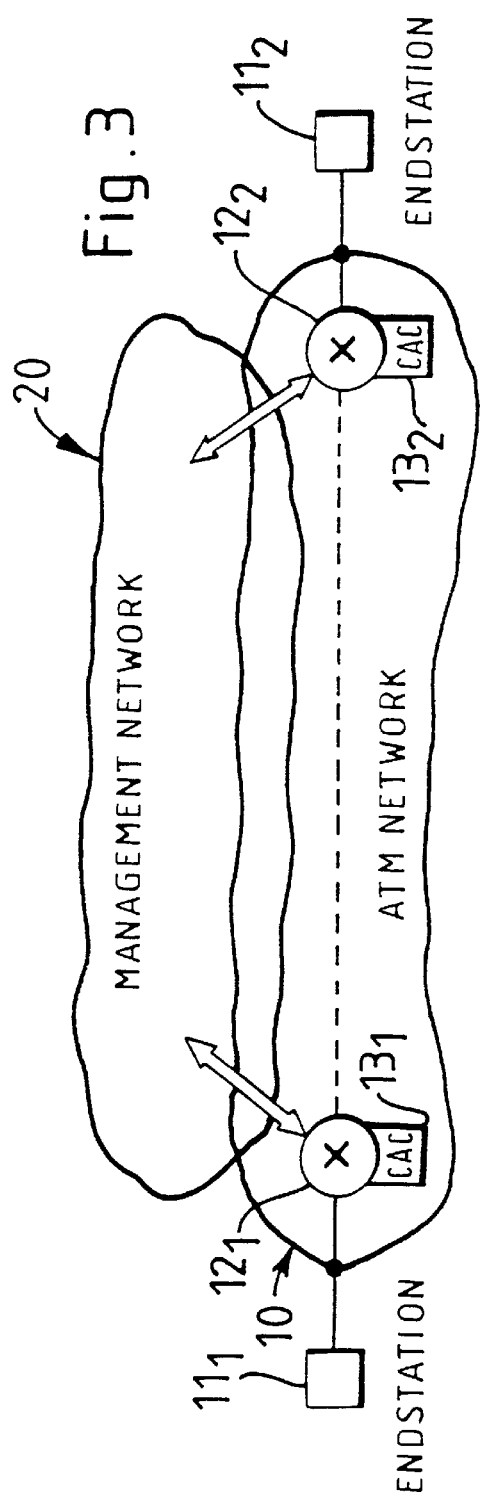

| STATE | μ LEN | PCR | MCR |
|---|---|---|---|
| 1 | 50 SEC. | 300 Kbps | 200 Kbps |
| 2 | 50 SEC. | 250 Kbps | 150 Kbps |

CONNECTION ADMISSION CONTROL FOR CONNECTION ORIENTATED NETWORKS

FIELD OF THE INVENTION

The present invention relates to the control of call acceptance in a communications network and in particular, an Asynchronous Transfer Mode (ATM) network.

BACKGROUND TO THE INVENTION

ATM is widely perceived as the next generation of high speed networking technology. ATM will integrate various electronic communications media that are used today into a multi-service network platform. ATM is a connection oriented network which implies that when requested, a connection is set up among a number of network termination points. At connection request time, a decision must be made whether the network can accept the new connection and satisfy its Quality of Service (QoS) parameters. The network also has to ensure that the existing connections in the network will not suffer degradation of QoS. Connection Admission Control (CAC) is the function in access ATM switches which performs this task. CAC is a component of every ATM switch that is capable of resource management. Normally it is positioned in the ATM Layer inside each and every ATM component that has authority over a physical link connected to it.

Previous research in the area of CAC for ATM networks has been concentrated in defining optimal statistical functions which make an efficient decision for one particular connection request. Typically, these solutions presume elaborate statistical traffic models characterizing a traffic source and are often computationally intensive. CAC is normally considered to be a control function inside an ATM switch with little other knowledge beyond the scope of the switch.

FIG. 1 shows how the connection control algorithm is normally presented. A source informs the CAC 2 of its need of a connection and the traffic characteristics it is going to use. These parameters are fed into a declarative part 3 which communicates with an estimation part 4 to get a clear picture of the strain that will be put on the network. The box 2 labelled "Connection Admission Control" shows the boundaries of the architectural specification of CAC. Many adaptive and intelligent algorithms have been proposed that need network measurements. However, since CAC is only active during the negotiation of the traffic contract no room has been left in the architectural specification for this behaviour.

A multiplex of voice, video and data connections appears to the network as a stream of cells sharing the same physical channel. Knowing the traffic descriptors and the QoS requirements, the CAC function must determine the amount of resources needed to achieve the traffic contract. CAC manages just one resource: network bandwidth. The simplest form of CAC is peak rate allocation. The algorithm for this ensures that the sum of the peak rates for each connection is less than the maximum utilization level—as a percentage—times the network capacity. A new connection request will be accepted or rejected solely on this criterion. The algorithm guarantees that no burst scale congestion occurs. However, cell scale congestion may still occur due to the discrete nature of the traffic at the cell level. This will lead to cell loss if no buffering is provided. Using appropriate queuing techniques the buffers can be dimensioned to guarantee less than a specified cell loss probability for a specified switch utilization.

Another form of CAC is an effective bandwidth scheme which preallocates an amount of bandwidth to each connection type (stored in a look-up table) that denotes the minimum amount of bandwidth needed for the connection to reach its QoS contract. The question of whether or not a new connection can be allowed on the network can then simply be answered by accumulating all effective bandwidths already in play on the link, adding the effective bandwidth of the new connection and comparing it to the link capacity. The problem with this approach is that the allocation of effective bandwidth tends to be somewhat conservative in order to ensure that the QoS contract is maintained at all times, irrespective of the real usage of bandwidth. This effectively restricts the number of connections that be accepted. Another, more computationally complex effective bandwidth scheme is one which calculates an effective bandwidth for each individual connection request on the basis of a number of traffic parameters specified by a source and by assuming certain mathematical traffic models. Statistical multiplexing techniques are used to determine the effective bandwidth, which will be a value between the peak and mean rates of the connection declared by the source. This technique is discussed in detail in the paper by R Guerin, H Ahmadi and M Haghsineh, "Equivalent capacity and its application to bandwidth allocation in high speed networks", IEEE Journal Selected Areas on Communications, 9(7); 968–981, September 1991. The main problem with this effective bandwidth approach is that QoS can only be met if the real source traffic parameters conform to the source declarations or if the source declarations can be enforced by a policing mechanism.

Neural networks and fuzzy logic have also been proposed as CAC algorithms. These concepts attempt to predict the statistical behaviour of the multiplexed sources and use this to predict the cell loss rate. The decision of whether to reject or accept an incoming connection can be made by comparing this prediction of cell loss rate to the goal value. Neural networks and fuzzy logic can be implemented in hardware, are capable of learning (adaptive fuzzy logic) and can run with incomplete data. These attributes make them particularly well suited to connection admission control, although they are difficult to train because of the diverse ATM traffic characteristics and QoS requirements.

Without a CAC algorithm the network has no preventive method for traffic congestion. Yet the question of the ideal algorithm for CAC is a difficult one to answer. The algorithm needs to make educated decisions on traffic flows that may vary greatly and have poorly defined characteristics. Furthermore CAC has to find a balance between the needs of the network operator and the users; a CAC algorithm should allow the network to run efficiently but should also guarantee a quality of service agreed with the user in the traffic contract. To further complicate the issue some connections may need guarantees about cell inter-arrival times.

The conventional schemes discussed above tackle this complexity in two ways: by assuming that the CAC function should only have a microscopic view of the network and by making assumptions about traffic behaviour. However, ATM has been designed and branded from the start as being a flexible multi-service networking architecture and therefore these existing algorithms make inappropriate assumptions and ultimately cannot be guaranteed to make efficient use of bandwidth.

SUMMARY OF THE INVENTION

According to a first aspect of the present invention, a method of providing control of call acceptance in a node of a connection orientated communications network comprises the step of periodically modifying a connection admission control function of the node in dependence on a measurement of bandwidth utilization of the node over an interval encompassing a number of call connections, wherein the connection admission control function of the node implements an effective bandwidth scheme which allocates an amount of bandwidth to each of a number of connection types and one or more higher layer connection admission control functions are responsive to traffic fluctuations to modify effective bandwidths for connection types stored by the node in a predetermined manner.

The measurement of bandwidth utilization may be made by the node itself. However, it is preferred that the measurement is made at a network management level since this simplifies the design of the node and makes use of the inherent computational resources of the overlying management network.

Preferably, the measurement is also made over a second, longer, interval as part of a third layer CAC function. Additional higher level CAC layers may also be provided.

Preferably, the measurement of bandwidth utilization is used to determine a surplus or a deficit bandwidth which is subsequently distributed amongst the connection types in a predetermined manner. Preferably, the distribution of bandwidth is on the basis of a mean bandwidth associated with each connection type.

Preferably, the communications network is an ATM network.

According to a second aspect of the present invention, a method of controlling acceptance of a call for a node in a communications network comprises the steps of: p1 maintaining a sum of effective bandwidths for a number of connection types on a link;
monitoring the real bandwidth utilized by connections on the link over an interval encompassing a number of call connections;
determining a surplus bandwidth for the link; and,
modifying the effective bandwidth allocated for each of the connection types by distributing the surplus bandwidth amongst the connection types in a predetermined manner.

According to a third aspect of the present invention, a network management device for managing resources in a telecommunications network comprises processing means for implementing a connection admission management function by measuring bandwidth utilization of an associated network node implementing an effective bandwidth type connection admission control function which allocates an amount of bandwidth to each of a number of connection types, the measurement of bandwidth utilization being made over an interval encompassing a number of call connections, wherein the processing means is arranged periodically to modify the connection admission control function of the node by modifying the effective bandwidths for connection types stored by the node in a predetermined manner.

According to a fourth aspect of the present invention, a communications system comprises a network node having processing means for implementing an effective bandwidth type connection admission control function which allocates an amount of bandwidth to each of a number of connection types, the communications system further comprising processing means to measure bandwidth utilization of the network node over an interval encompassing a number of call connections and periodically modify the connection admission control function of the node by modifying effective bandwidths for connection types stored by the node in a predetermined manner.

Preferably, the communications system comprises a management network which interfaces with a telecommunications network.

Preferably, the management network comprises a computer memory encoded with computer executable instructions for monitoring bandwidth utilization over one or more intervals of different lengths and for causing a change in the CAC function of the network node in dependence on this.

Preferably, the communications system comprises an ATM network.

In the present invention a multi-layered approach is taken to the provision of connection admission control. In a preferred embodiment, a simple linear CAC function is embedded in a node, such as an ATM switch, which can be modified by adaptive higher level control functions provided by an overlying network management layer which monitors traffic fluctuations over a longer term. The technique does not rely upon source declarations to determine the effective bandwidth for a connection. Instead, an effective bandwidth is preallocated for each connection type which is subsequently modified heuristically to reflect real bandwidth useage. The question of whether or not a new connection can be allowed on the network can then simply be answered by accumulating all effective bandwidths already in play on the link, adding the effective bandwidth of the new connection and comparing it to the link capacity.

BRIEF DESCRIPTION OF THE DRAWINGS

An example of the present invention will now be described in detail with reference to the accompanying drawings, in which:

FIG. 2 shows a simplified example of an ATM network;

FIG. 3 illustrates an interface between an ATM network and a management network;

DETAILED DESCRIPTION

Figure 1:
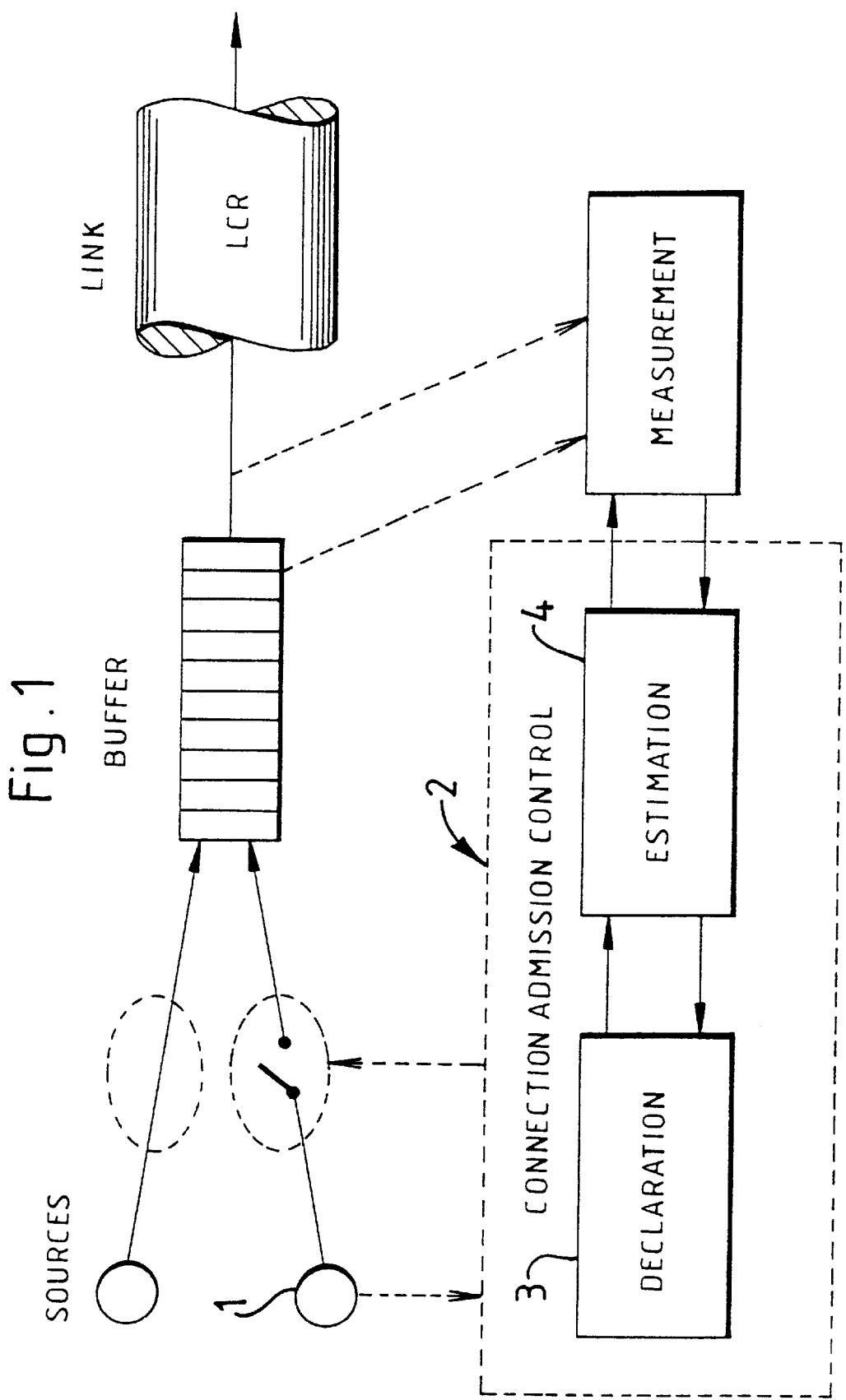
FIG. 1 shows a generic CAC architecture.

FIG. 2 shows a simplified view of an ATM network 10 which includes a number of endstations connected across the network by a number of ATM switches 12 (network nodes). During a connection set up stage a contract is established between a source endstation 11 and the network 10. After that the route through the network is set up. Each node along the path that manages resources (bandwidth) is asked to confirm the traffic contract using an embedded connection admission control function 13. If one node returns a notification that it is unable to route the connection the network may decide to either route the connection through some other node or reject the connection. Not all ATM components include a CAC function. For example, simple ATM components such as ATM cross connects (not shown) do not route connections and therefore do not manage network resources. Furthermore, intermediate nodes 14 in a particular Virtual Path Connection (VPC) that is selected for a route are not responsible for managing resources; only the end nodes 12 of a VPC do this. Accordingly, only the end (access) ATM switches 12 for the VPC shown in FIG. 2 include CAC 13 in the switch fabric.

FIG. 3 shows a network management layer 20 which overlies an ATM network 10. The network management layer 20 is a separate but connected data communications network based on the telecommunications management architecture defined by ITU-T. The network management layer 20 has substantial computational resources and receives information from the whole network. In this example of the present invention, this computational power is combined with information relating to network performance using, for example, heuristic techniques, to identify traffic trends over the longer term and subsequently modify the CAC performance of the appropriate access ATM switches 12 in some manner to improve the use of available bandwidth. The aim is to maximize the number of calls admitted to the network whilst maintaining call Quality of Service (QoS). The network management layer 20 can achieve this not only on the basis of the measured bandwidth utilization of an individual ATM switch but also by making use of information communicated to it from other network nodes.

As will be described in detail below, bandwidth efficiency is improved by using the network management layer 20 to identify traffic trends over the short term i.e. several minutes, and the longer term i.e. several hours. A simple effective bandwidth linear CAC is provided in the ATM switches 12 (first layer CAC) whilst an adaptive CAC algorithm is provided in software at the network management layer 20 (second layer CAC) which is responsive to short term traffic fluctuations encompassing a number of call connections. The network management layer 20 may also provide a further CAC management function (third layer CAC) by measuring traffic fluctuations over a longer term to modify the second layer adaptive CAC function in a predetermined manner. This may include the ability to replace the second layer adaptive CAC algorithm entirely with another more suitable algorithm. This multi-layered CAC architecture is shown schematically in FIGS. 4 and 5.

The linear effective bandwidth scheme implemented in the first layer CAC bestows an amount of bandwidth to each connection type that denotes the minimum amount of bandwidth needed for the connection to reach it's QoS contract. The question of whether or not a new connection can be admitted is answered simply by accumulating all effective bandwidths already in play on the link, adding the effective bandwidth of the new connection and comparing it to the link capacity.

Figure 4:
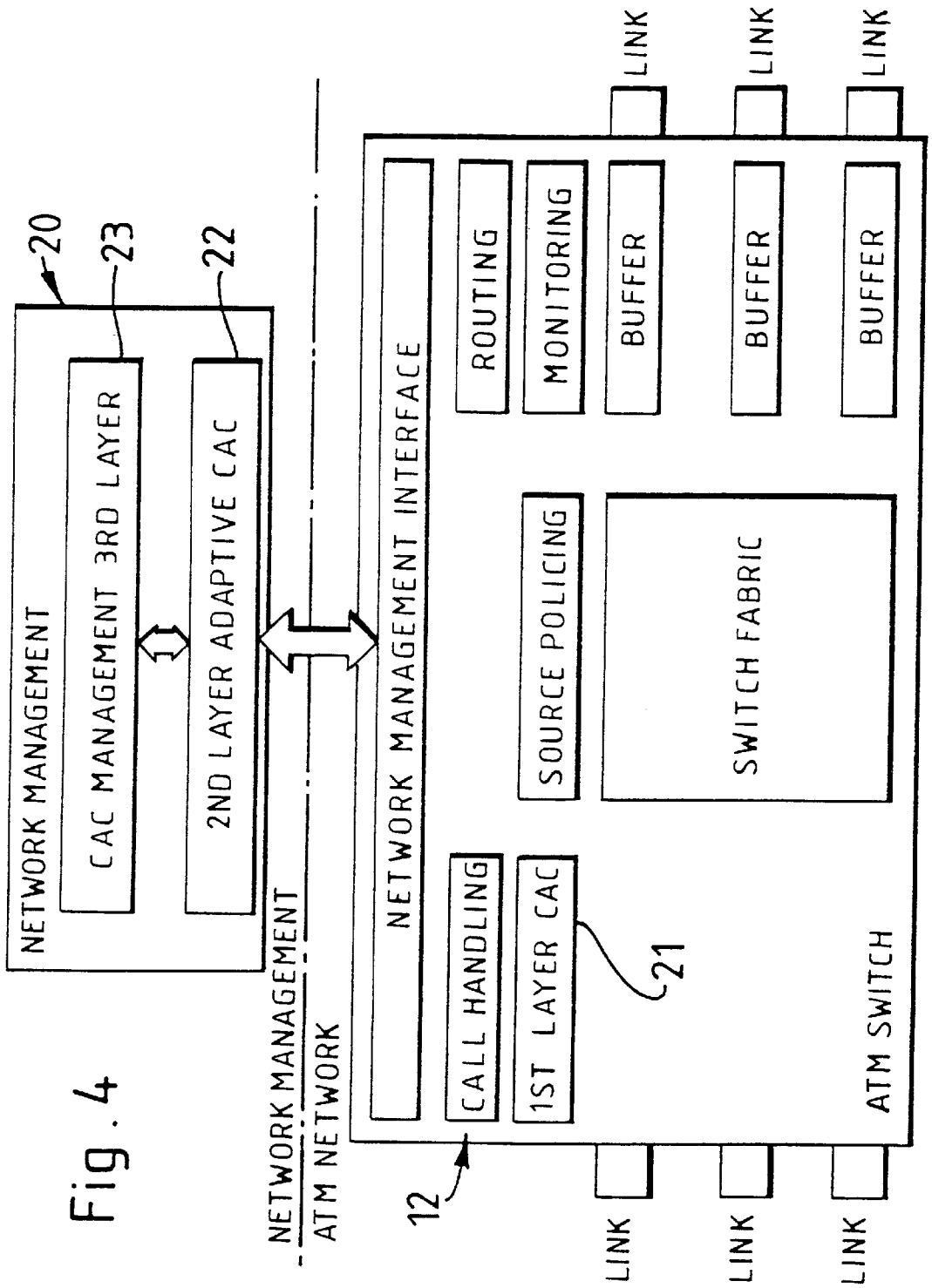
FIG. 4 illustrates an interface between an ATM switch with CAC and a management network in accordance with the present invention.
Figure 5:
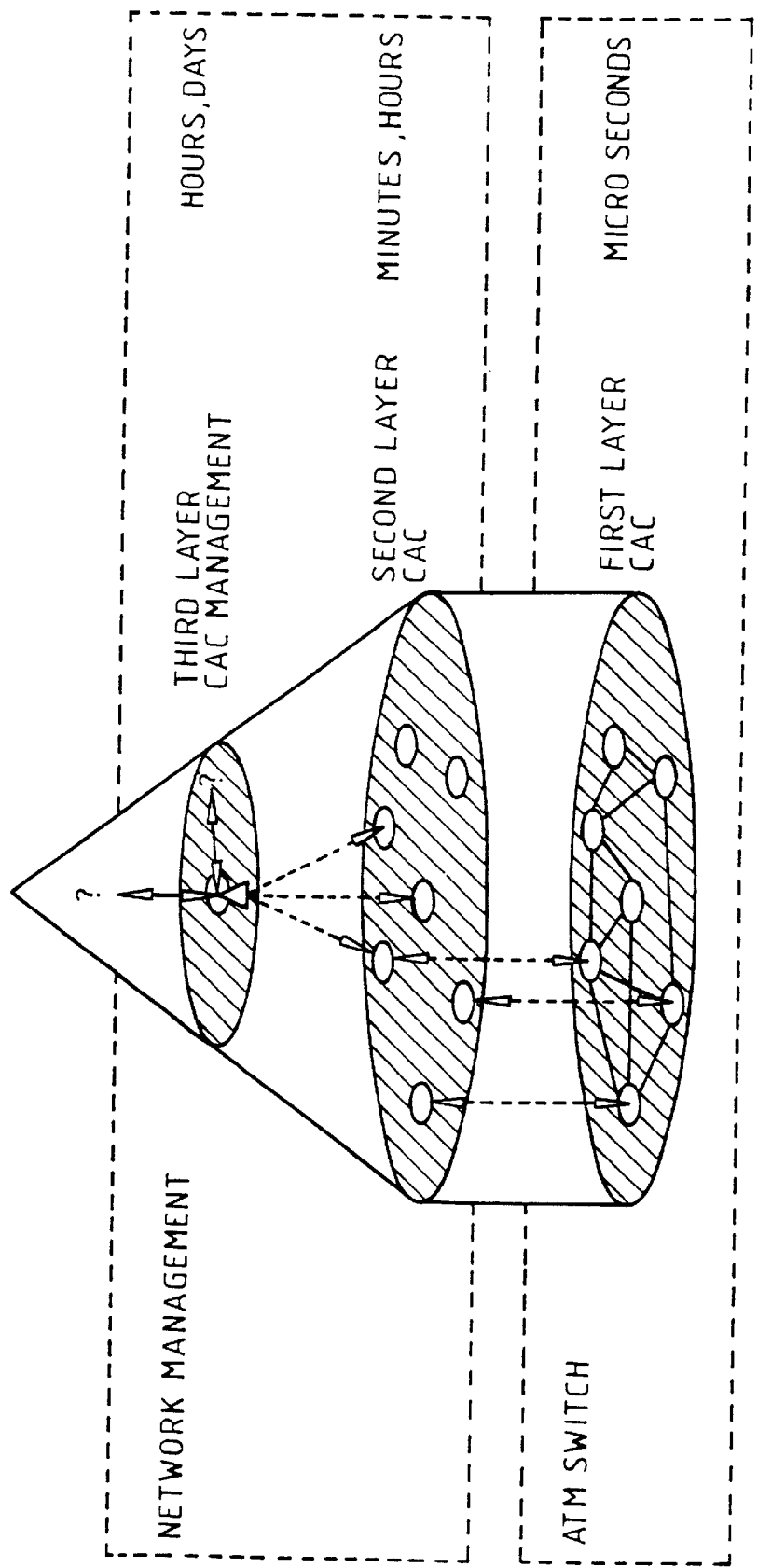
FIG. 5 illustrates the relationship between elements of a multi-layered CAC in accordance with the present invention.

As shown in FIG. 4, an ATM switch 12 includes a memory device 21 which stores the linear effective bandwidth software (first layer CAC) and also provides a database of current effective bandwidths for connection types, for example, speech, video, etc. As will be described in detail below, the stored value of each of the effective bandwidths is periodically updated by a second layer adaptive CAC to attempt to improve the efficiency of the switch 12. The second layer adaptive CAC function is implemented in software by the network management layer 20 which stores one or more CAC algorithms in a memory device 22. The second layer adaptive CAC algorithm uses heuristics to attempt to modify the effective bandwidth allocated to each connection type stored by the ATM switch 12 by distributing any surplus or deficit bandwidth. This is described in detail below.

The second layer CAC algorithm stored as software in memory device 22 is adaptive in that it uses information gathered in the past to define its current behaviour. In particular, it has to take changes in the network into account and deal with them adaptively. This adaptivity comes not so much from the algorithm itself as the usage of a particular network measurement that will change as the algorithm sets a new effective bandwidth. The central idea of the second layer adaptive CAC is very simple; it tries to set the effective bandwidth of a connection type to the amount of real bandwidth a connection type needs. As the effective bandwidth of a connection type changes more or less connections of that type will be admitted. After the effective bandwidth of a connection type has, for example, been increased a new connection request will require more bandwidth on a particular VPC. Effectively this will lead to less connections being admitted on the VPC.

The second layer CAC algorithm has two states; it is either monitoring the VPCs connected to the ATM switch 12 or it is changing effective bandwidths on connection types that are defined on the switch 12 in the memory device 21. The time interval between the two states can be specified or set elsewhere. The algorithm is cautious; it actively monitors the cell loss incurred by the connections and will try to fall-back when cell loss might be due to the algorithms operation. During the state change information is stored that can be used to fall back to. If the cell loss stays high the algorithm tries to fall back to an even earlier situation. If no earlier situations are defined it will just calculate the effective bandwidth changes that are required and enforce them.

To change the effective bandwidth, the algorithm performs the following steps:

1. Determine Cell Loss Changes

Cell loss will not be a static variable because it will change continuously to reflect the actual use of the VPC. The uncertain nature of the traffic on the VPC means that small variations in the amount of cell loss should be ignored by the algorithm. Large variations in a time frame that is many times larger than a burst could indicate an erroneous decision on the part of the second layer adaptive CAC algorithm. Let $t_n$ denote the current time and $t_{n-1}$ the last time that a change was made to an effective bandwidth. $\epsilon(t)$ will model the cell loss of a VPC on time t and $\epsilon_c$ will be the cell loss objective for that VPC. $\Delta$ is a parameter that can be set by the network management layer; it models the maximum allowed cell loss increase between $t_n$ and $t_{n-1}$.

$$\epsilon(t_n)-\epsilon(t_{n-1})\leq\Delta \quad (1)$$

$$\epsilon(t_n)<\epsilon_c \quad (2)$$

Equation (1) models the allowable small positive fluctuations in cell loss, whereas equation (2) sets the hard target.

If the measured cell loss fails to fit into these equations the algorithm will reset the effective bandwidths to values that were acceptable at some previous point in time. Note that the network traffic behaviour might have changed due to some other network management function operating on it; changing the effective bandwidth back to a value acceptable in some previous state might not change the cell loss situation at all. If both conditions are met in this frame, the changes made in the last frame were successful. The correct set of effective bandwidths should now be changed to include the effective bandwidths set recorded at $t_n$. The next step in the algorithm should only be taken if both Equations (1) and (2) hold for the current situation. If it is assumed that there is such a thing as an optimal effective bandwidth for every connection type, equation (2) could be made more strict:

$$\epsilon(t_n) < \epsilon(t_{n-1}) \leq \epsilon_c \qquad (3)$$

2. Determine Surplus Bandwidth

The surplus bandwidth is the amount of allocated effective bandwidth that is not used by the real bandwidth. In essence it is the amount the total allocated effective bandwidth should change to reach the optimal case. Let $T(t_n)$ be the set of time points at which measurements were made in the time interval $[t_{n-1}, t_n]$. $K(t_n)$ represents the number of elements in $T(t_n)$ and $x_j(t)$ will be the instantaneous bandwidth of connection number j at time t. The surplus or the amount the total allocated effective bandwidth should change is:

$$\gamma(t_n) = \frac{\sum_{i \in T(t_n)} \left( \sum_i v_i(t)a_i(t) - \sum_j x_j(t) \right)}{k(t_n)} \qquad (4)$$

Note that the interval $[t_{n+1}, t_n]$ which denotes the amount of time that should be between two different executions of the equation should be large enough to allow the current connections to finish. The allocated effective bandwidth of a certain connection type is only used at connection set up. If the time spent monitoring is set to a value that does not permit old connections to finish and new connections to be setup, the parameters set during the last execution of the equation would not yet have taken effect. Another important notion is that $\gamma(t)$ can be both positive and negative.

3. Change the Effective Bandwidth of the Stream

The previous step in the algorithm defines an average surplus $\gamma(t)$ which gives the amount the effective bandwidth of the total stream should be changed to decrease the amount of overused bandwidth or to decrease the amount of unused bandwidth. The total stream is built up using several connections of possibly different types. Due to fluctuations in the traffic the exact cell composition of the stream is unknown and therefore it is necessary to make some sort of approximation. The approach in this example is to distribute the surplus among the connection types in such a way as to reflect the mean bandwidths allocated.

Let $M_i$ be the mean bandwidth for connection type i and $M(t)$ be the total allocated mean bandwidth at time t—equation (5)—or the total allocated effective bandwidth—equation (6). Let n be the total number of connection types. $B_i(t_n)$ is used to store the unbounded new effective bandwidth for connection type i:

Using mean bandwidths to partition:

$$M(t_n) = v_i(t_n)m_i + \ldots + v_n(t_n)m_n \qquad (5)$$

$$\mathcal{B}_i = a_i(t_{n-1}) - \frac{\gamma(t_n)m_i}{M(t_n)} \qquad (6)$$

Using effective bandwidths to partition:

$$M(t_n) = v_i(t_n)a_i(t_n) + \ldots + v_n(t_n)a_n(t_n) \qquad (7)$$

$$\mathcal{B}_i(t_n) = a_i(t_{n-1}) - \frac{\gamma(t_n)a_i(t_{n-1})}{M(t_n)} \qquad (8)$$

As can be seen in equations (6) and (7), M(t) is only used as a distribution key: its numerical value is of little consequence as long as all the $B_i(t_n)$ add up to a real partition of the surplus bandwidth. The bounded effective bandwidth should be:

$$a_i(t_n) = \begin{cases} scr_i & \text{if} & \mathcal{B}_i(t_n) < scr_i \\ pcr_i & \text{if} & \mathcal{B}_i(t_n) > prc_i \\ \mathcal{B}_i(t_n) & \text{otherwise} \end{cases} \qquad (9)$$

An alternative approach is to distribute the surplus linearly among the different connection types. For example, if there are 50 connections then each connection type should change by $\gamma_i(t_n)/50$. However, this distribution is not suitable where there are many different connection types since it totally disregards any notion of scale. A video connection and a voice connection could, for example, both get an increase of 0.1 Mbps, where the video was previously set to 2 Mbps and the voice to 0.064 Mbps.

4. Determine Individual Changes

The input parameters of the actual CAC are controlled on a per node basis. Links, VPCs and individual connections are bi-directional. The effective bandwidth for each direction is calculated by the two second layer adaptive CAC functions located at the end points of each VPC (see FIG. 2), and then these two CAC functions communicate the different effective bandwidths. The maximum of these two effective bandwidths for a particular connection type is chosen and stored by each second layer adaptive CAC and used in future calculations.

The main purpose of the third layer CAC function stored in memory device 23 is to identify long term trends—in the order of hours—and to enforce the correct operation of the second layer CAC function. This layer is responsible for correlating information from a number of switches in the ATM network or the entire network into a comprehensive image of the fluctuations of effective bandwidths of the different connection types.

The function of the third layer CAC is as follows:
(i) Identify new or different network usage. As the entire CAC management is so intimately involved with matching used bandwidth with the allocated bandwidth, a top network management software function identifies critical points in the network or the shifting of these points as time progresses. Trends might indicate, for instance, that certain VPCs could do with backup in the form of other VPCs during a particular time of the day or week. This information could be used to steer second layer CAC algorithms.

(ii) Configure/Set up lower CAC layers. If a new node is added to the network or the network has just started its operation, each of the nodes needs to be paired with a second layer adaptive CAC function. Some second layer CACs might also need a number of input parameters. These parameters need to be set to reasonable defaults. All this functionality is controlled by the third layer CAC.

(iii) Identify faulty hardware or software. ATM switches of a particular make that operate at a sub-optimal performance level during some particular time-interval might not be noticed by normal fault protection methods. Problems with this hardware could occur because of particular traffic behaviour that is also bound to this interval. As discussed above, the second layer CAC algorithm is a piece of software that could need valid input parameters to operate correctly. Erroneous input parameters could lead to bad behaviour. The second layer CAC could also just have bugs in its implementation. The third layer CAC is arranged to identify these problems and may remove the affected component. It is possible to remove one second layer CAC algorithm and put another in its place.

(iv) Compare two sets of network elements. Ultimately, bandwidth efficiency is one of the most important attributes of a network element. The third layer CAC management function is able to compare two sets of hardware or software over a period of time and compare their bandwidth efficiency. Multiple second layer CAC strategies could, for instance, be tried simultaneously throughout the network.

(v) Improve network efficiency by direct means. The primary function of the third layer CAC management function is to monitor the effective bandwidth behaviour of connections over a longer time period. If, for instance, the effective bandwidth of a connection type is oscillating, the third layer CAC management function could set it to mean value.

The second layer CAC algorithms change the effective bandwidths for connections at a periodic rate. These changes are notified to the third layer CAC and may there be subject to further analysis. Trends can be identified and then be used to speed up convergence of the second layer CAC algorithms and to detect and remove oscillation. The incoming data may be transformed from deterministic to real information using a cubic spline approximation. This transformation is done to allow other functions to be applied on the data.

In the initial stage two sets of effective bandwidths are declared similar when they have the same differential ratios in the individual sets. Note that the sets will need to be normalized in the time direction to be able to make this comparison. Once a trend is identified it is entered into a trend database that is shown below in Table 1.

TABLE 1

Stored Trend information format

| KEY NAME | DESCRIPTION |
|---|---|
| trend | list of time, effective bandwidth pairs describing the trend |
| function | the function information that is used to describe the trend |
| diff | the differentiated function |
| difff | the second differentiated function |
| int | the integrated function |
| discovery time | time stamp at which the trend was first seen |

TABLE 1-continued

Stored Trend information format

| KEY NAME | DESCRIPTION |
|---|---|
| occurred | number of times it has been seen throughout the network |
| vpcs | list of VPCs where it has been encountered |

Figure 6:
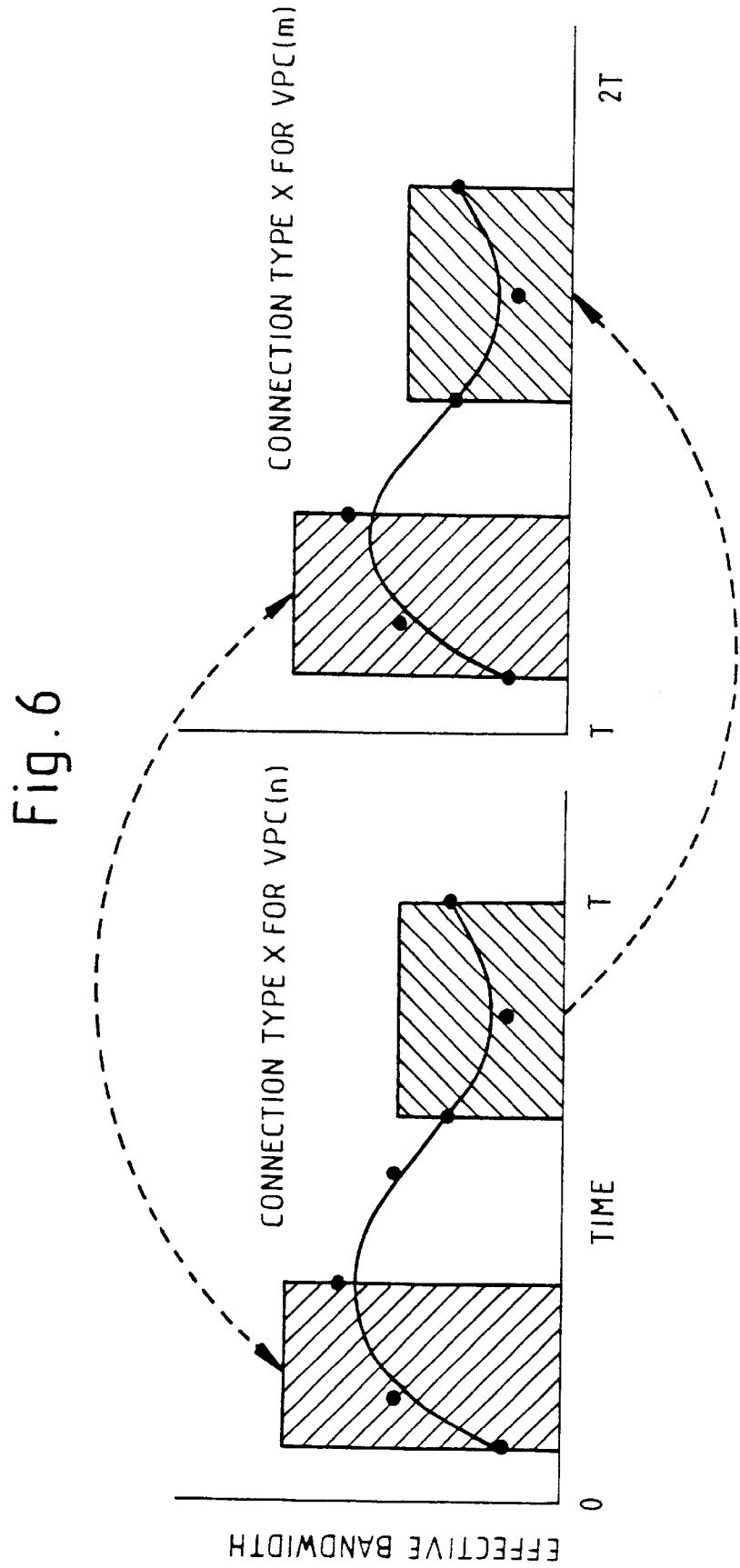
FIG. 6 illustrates how trends for one connection type can be used to speed up convergence in another connection of the same type.

The second layer CAC is always looking for an optimal (local) effective bandwidth. The algorithm slowly converges on the optimal effective bandwidth for a particular connection type. The known traffic behaviour of a connection type can be used to speed up this converging process. Assuming that the second layer CAC is a reactive process, the calculated optimal value at point $t_n$ is actually the optimal value of point $t_{n-1}$. This is caused by the fact that the data used to construct the optimal value is gathered between $t_n$ and $t_{n-1}$. FIG. 6 shows how the optimal value of a VPC n can be used as the optimal value of a VPC m. After an initial match has been made between the two effective bandwidth functions, the optimal effective bandwidth for VPC m is set using the one previously calculated for VPC n in the same situation.

Using trends to speed up convergence will not be of any use if there is no convergence of the trends. Each connection type is considered independently and on a per-node basis. For each connection type a cubic bezier spline is set up using the last 8 calculated effective bandwidth points as control points. This spline is then differentiated so that slope information is available. A sign analysis of the differentiated function can then establish whether or not the function is oscillating. If this is the case, humps in the oscillation can be calculated using the integrated spline. These humps can then be compared against each other to see what type of oscillation has to be dealt with. Whenever oscillation is identified, any stored trends describing the oscillation will be removed from the database. A new optimal value i.e. the value that the trend is oscillating on, will be set in the network in an effort to stop the oscillation.

EXPERIMENTS

Figure 7:
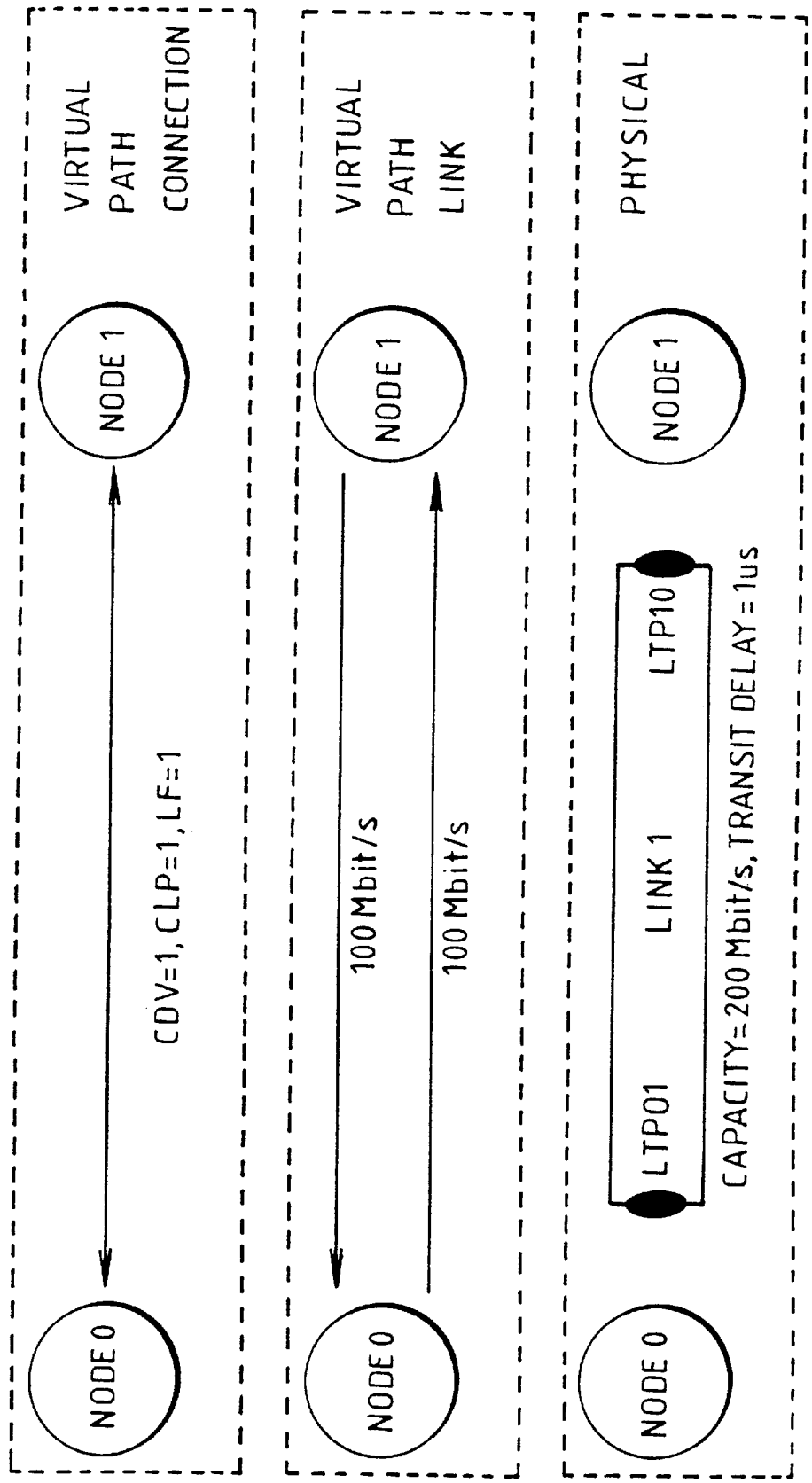
FIG. 7 shows a network setup used in a network simulator to conduct a number of experiments.

During each of the experiments defined in this section the network setup shown in FIG. 7 is used. Each experiment shows the simulation results of a simulation specification for two cases; one in which the multi-layered CAC management system is disabled and one in which it is enabled. The term "reserved bandwidth" in the Figures refers to the amount of bandwidth that the VPC reserves of the physical link. It will therefore always lie at 100 Mbps.

Experiment 1

The first experiment was designed to test the second layer adaptive CAC algorithm.

Specification

Figure 8:
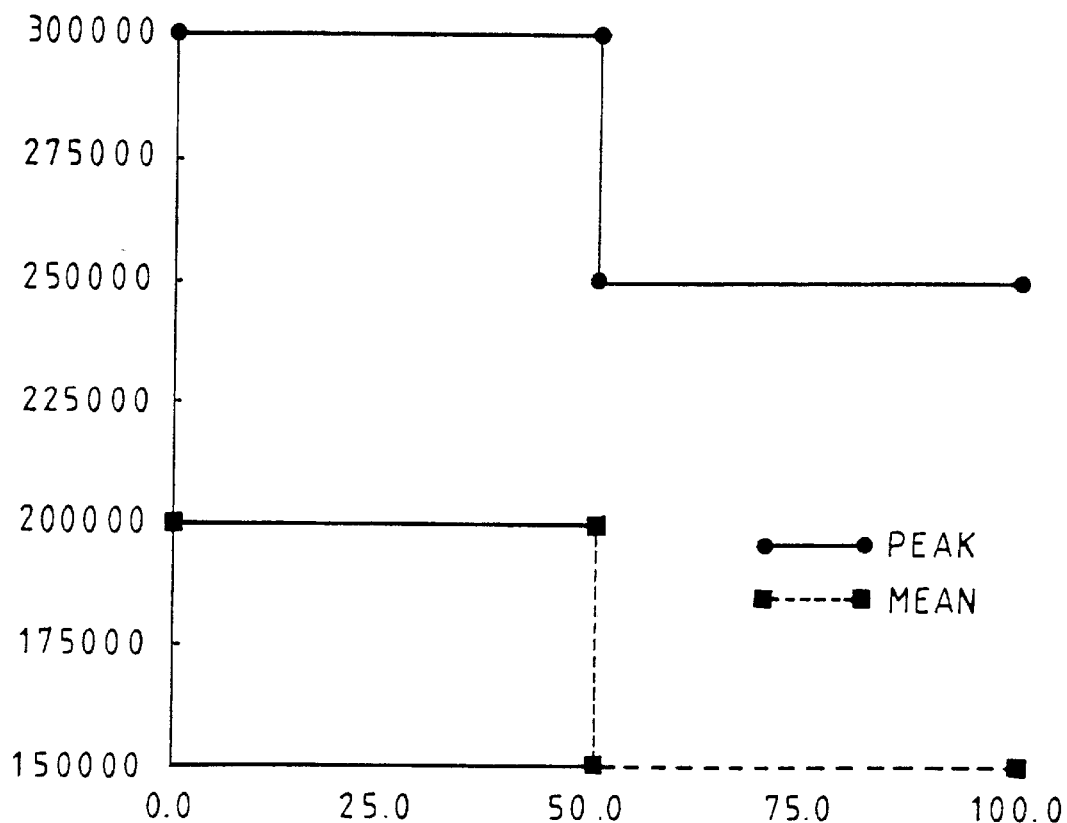
FIG. 8 shows a burst profile for a connection type used by the simulator.

VPC1 is saturated by 800 users who all have a call pattern in which all connections are of type CxType1. These users make their calls from NODE0 and want to reach NODE1. The connection type's burst profile is shown in FIG. 8. Bursts are generated in two alternate states. In each state, a burst is generated from a truncated negative exponential distribution, with a peak and mean cell rates. Connections have an average duration time of 100 seconds and arrive within 10 seconds of each other. The simulation was run for 2 hours.

The second layer adaptive CAC was set up to spend 150 seconds data-gathering, the soft cell loss limit set to a 1000 cells and the hard cell loss limit set to an allowed maximum of 1 cell lost for every nanosecond. The initial effective bandwidth of the connection type is set to 500 Kbps in the forward direction. Since the effective bandwidth that the adaptive CAC would normally set the connection type to will always be between the peak and the mean rate of that connection type, this behaviour was disabled in this experiment to enable a more comprehensive study of the convergence of the algorithm.

The initialization values for the effective bandwidth of connection-type CxType1 make the allocation of connections in the forward direction more expensive than they need to be. The network expects the connections to take up 500 Kbps whereas they will only take 300 Kbps at peak rates. After the first 150 seconds the adaptive CAC should notice the vast amount of bandwidth that is allocated but left unused. This should spur it into action to change the effective bandwidth of connection type CxType1 into a lower value. After n iterations of the algorithm the optimal value should lie between the specified peak and mean rates of the burst profile of connection CxType1.

Figure 9:
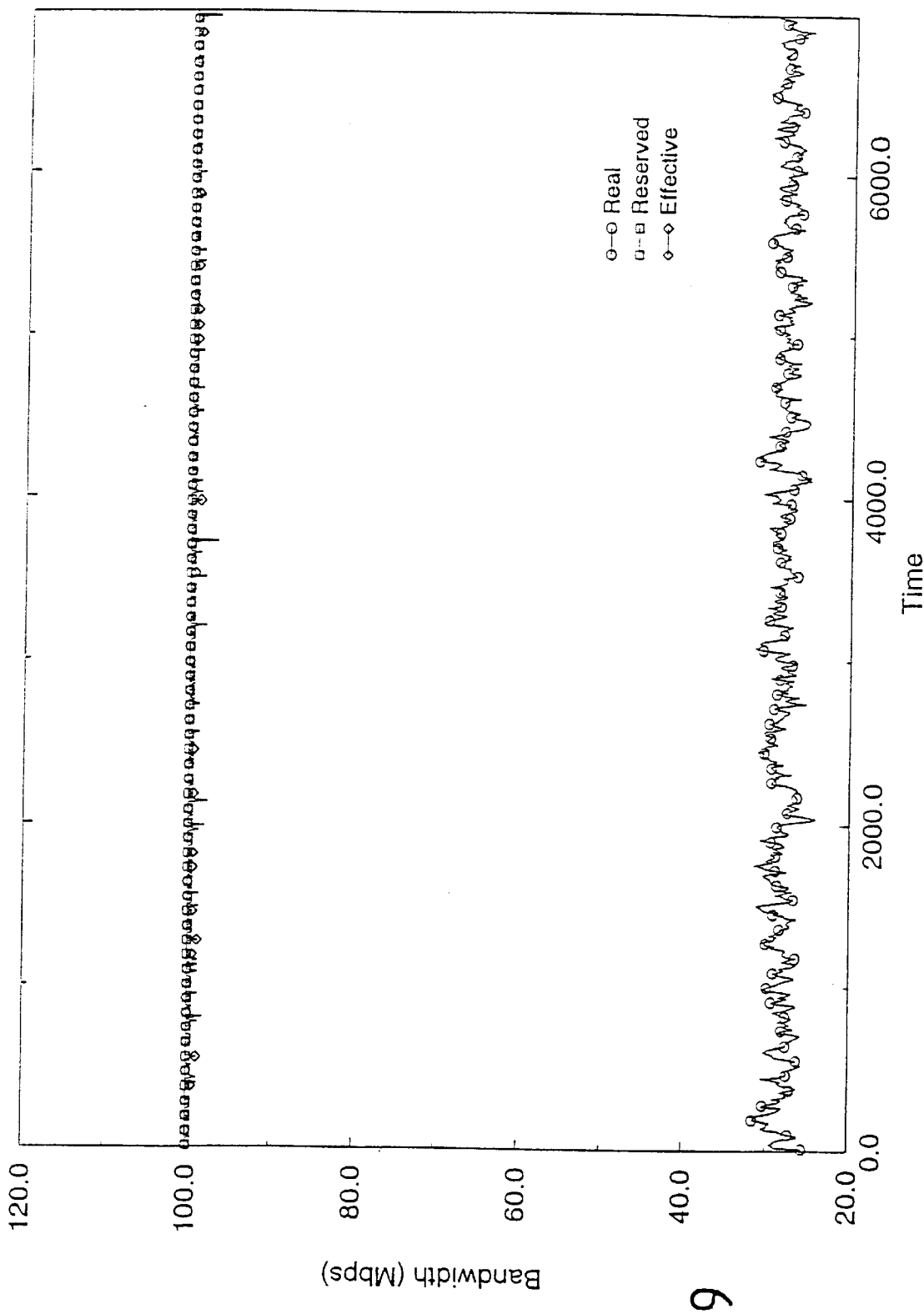
FIG. 9 shows network simulation results for experiment 1 with multi-layered CAC disabled.
Figure 10:
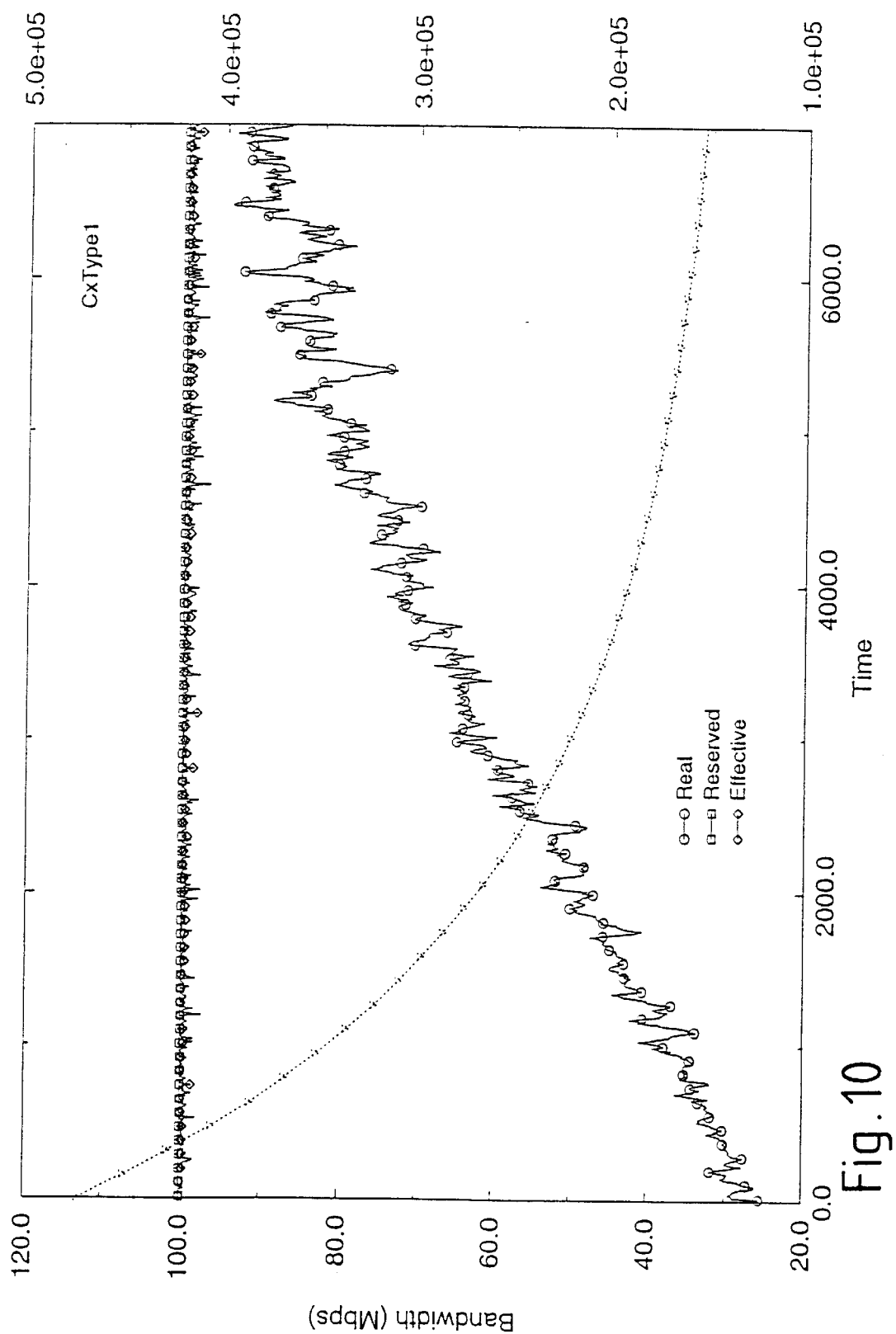
FIG. 10 shows network simulation results for experiment 1 with multi-layered CAC enabled.

FIG. 9 shows the network simulation results without multi-layered CAC interference. It is clear that the amount of real bandwidth used is about 30%, leaving 70% of the bandwidth capacity allocated but unused. FIG. 10 shows the same simulation with the multi-layered CAC enabled. This Figure now also shows the effective bandwidth of the connection type that was modified. The effective bandwidth of connection type 1 is clearly being sized down in an effort to reduce the amount of unused allocated bandwidth in the network. Towards the end of the simulation it is still not stabilized and dropping below 160 Kbps. This result might be unexpected at first as the intuitive value lies at 175 Kbps. When the inter-arrival times between the different connections are taken into account however, the optimal value can be calculated as being 157.5 Kbps.

Table 2 below shows the comparison summary. Note that the data has been gathered at 10 second intervals; it provides a rough estimate of the total bandwidths that have been used. From this table it is clear that the usage of real bandwidth has been significantly improved when the multi-layered CAC was enabled. The number of connections has gone up correspondingly.

TABLE 2

Results experiment 1

| ITEM | CUMULATIVE MCAC | NO-MCAC |
|---|---|---|
| Reserved bandwidth | 71900 Mb | 71900 Mb |
| Real bandwidth | 45924.74 Mb | 20306.23 Mb |
| Completed connections | 29378 | 13063 |
| Cells lost | 0 | 0 |

Experiment 2

The second experiment was designed to test the way the second layer adaptive CAC distributes the changes in effective bandwidth. After the algorithm has spent a period of time data-gathering, data is available that defines the surplus of allocated effective bandwidth on the entire stream. This surplus has to be transformed into individual bandwidth changes for the effective bandwidths of the connection types.

Three different connection types were simultaneously employed on VPC1 with a number of different users. At any one time during the simulation 20 users use the video conference connection type, 200 users use the video connection type and another 200 users use the normal telephone connection type. Note that the connection type names were chosen rather arbitrarily, the name of the connection type should not imply certain traffic behaviour. The burst profiles and the call behaviour are shown below in Tables 3 to 5. The traffic parameters were set up to be extremely bursty to further test the algorithm's robustness.

TABLE 3

Burst Profile Experiment 2

| NAME | STATE | $\mu$ LEN | PCR | MCR |
|---|---|---|---|---|
| Video Conference | 1 | 2 | 3M | 200K |
| Video Stream | 1 | .5 | 300K | 200K |
|  | 2 | .2 | 250K | 150K |
| Speech |  | 2 | 1200 | 800 |

TABLE 4

Call Pattern Experiment 2

| NAME | $\mu$ DURATION | $\mu$ IAT |
|---|---|---|
| Video Conference | 10 | 2 |
| Video Stream | 6 | 6 |
| Speech | 20 | 20 |

TABLE 5

Traffic Profile Experiment 2

| NAME | $\mu$ CALLERS | START | STOP |
|---|---|---|---|
| Video Conference | 20 | 0 | 7200 |
| Video Stream | 200 | 0 | 7200 |
| Speech | 200 | 0 | 7200 |

As with experiment 1, the adaptive CAC was set up to spend 150 seconds data-gathering, soft cell loss limit was 1000 cells and hard cell loss limit was 1 cell lost for every nanosecond. The initial effective bandwidths of the individual connection types were set to the sustainable bandwidths defined in the burst profiles. The effective bandwidth behaviour previously disabled in experiment 1 is now enforced and enabled.

Figure 11:
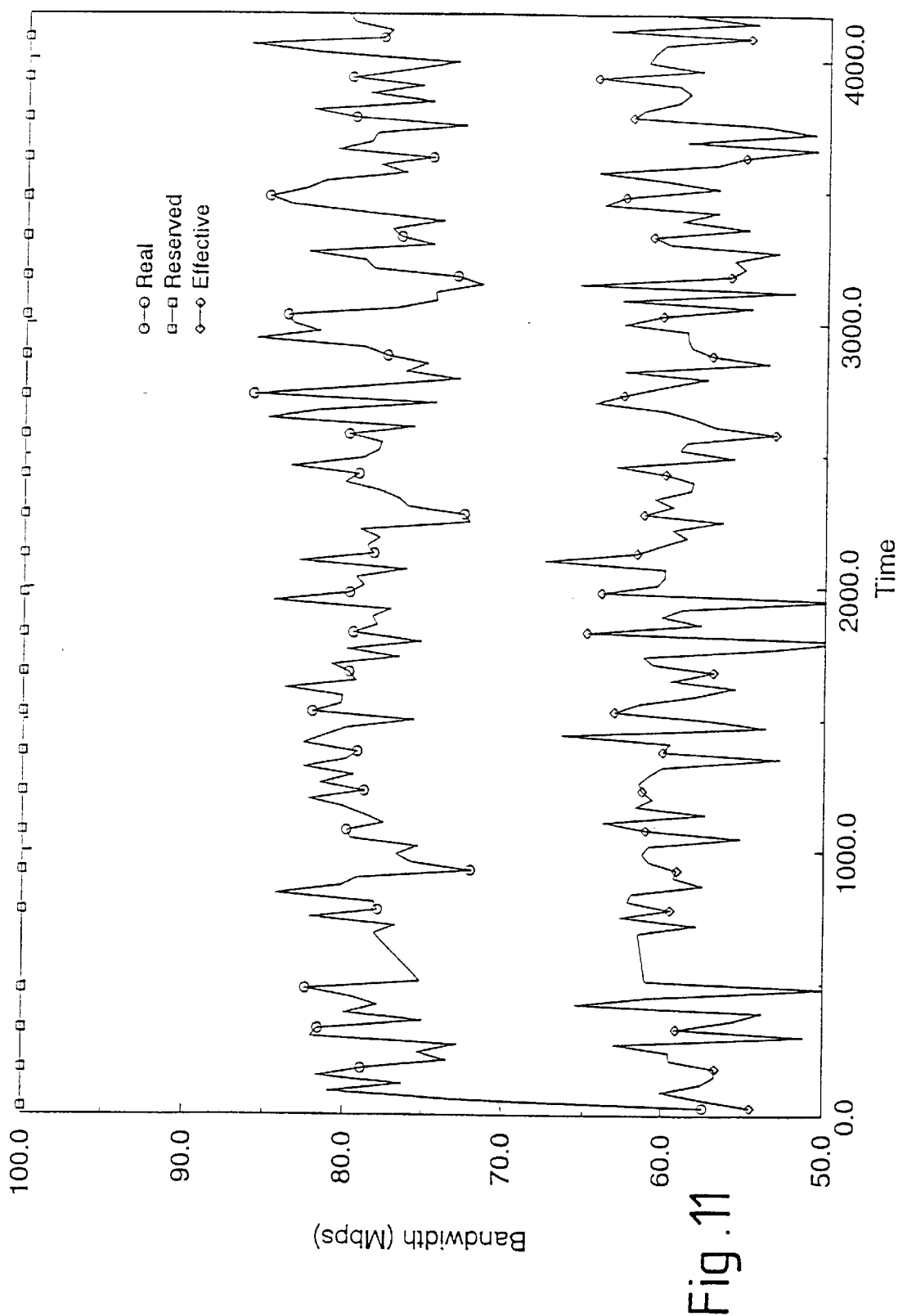
FIG. 11 shows network simulation results for experiment 2 with multi-layered CAC disabled.
Figure 12:
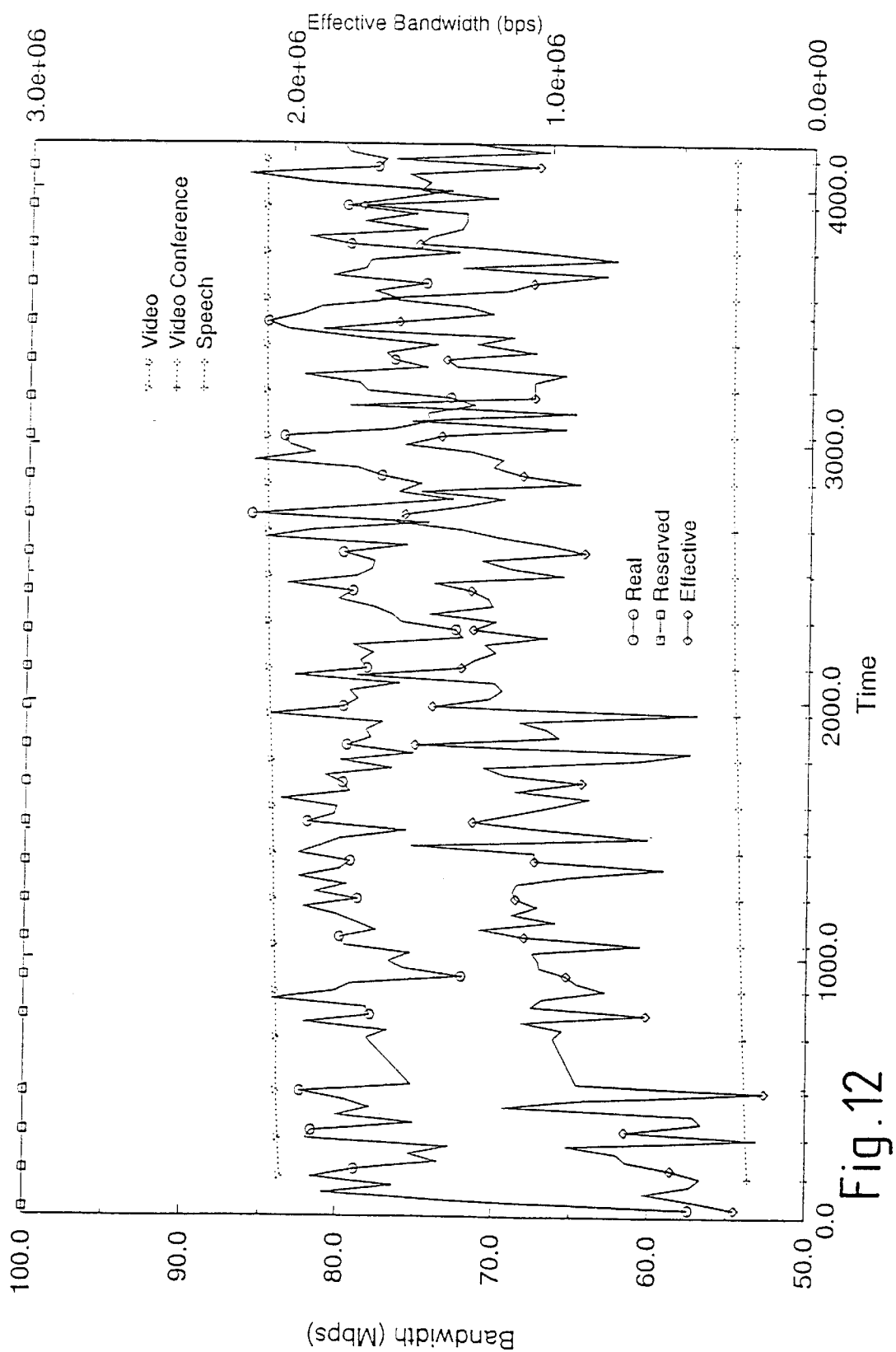
FIG. 12 shows network simulation results for experiment 2 with multi-layered CAC enabled.
Figure 13:
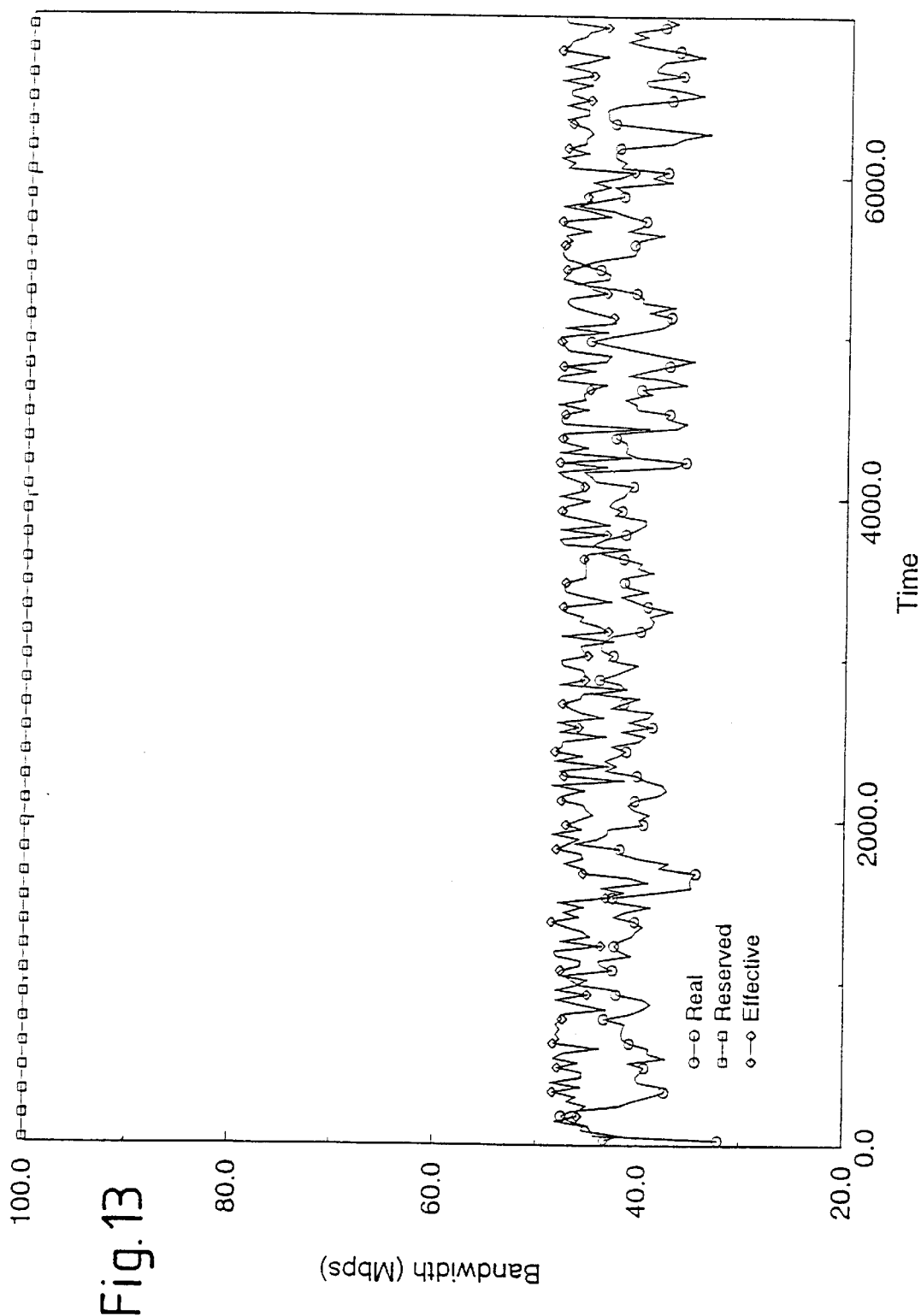
FIGS. 13 and 14 show network simulation results for experiment 3 with multi-layered CAC disabled; and, FIGS. 15 to 17 show network simulation results for experiment 3 with multi-layered CAC enabled.

FIG. 11 shows the network simulation results without the multi-layered CAC enabled. The Figure shows quite clearly that the estimation of the effective bandwidth of the individual connection types was too low. The real bandwidth used throughout the simulation is about 20 Mbps more than allocated. FIG. 12 shows the same simulation with multi-layered CAC enabled. The effective bandwidth curve slowly converges on the real bandwidth curve. The burstiness of the traffic makes the computation of the optimal effective bandwidths for the individual connection types more involved. As can be seen in the Figure, the effective bandwidths are increased which indicates that the effect of the inter-arrival times is surpassed by the effect of the burstiness of the traffic. The changes to the telephone connections are shown but are hard to discern because of the scale differences between it and the other connection types. The telephone connection's effective bandwidth gets set to its peak cell rate quite early due to the effects of the other connections. Table 6 below shows the cumulative summary.

TABLE 6

Results experiment 2

| ITEM | CUMULATIVE MCAC | NO-MCAC |
|---|---|---|
| Reserved bandwidth | 13400 Mb | 13400 Mb |
| Real bandwidth | 10521.71 Mb | 10521.71 Mb |
| Effective bandwidth | 9139.04 Mb | 7901.61 Mb |
| Completed connections | 93631 | 93631 |
| Cells lost | 0 | 0 |

Experiment 3

The third experiment was designed to see how the heuristic algorithm reacts when a connection type suddenly changes its traffic behaviour. This experiment was primarily intended to test the flexibility of the heuristic CAC algorithm.

As in experiment 2, three different connection types were employed on the VPC. At any one time during the simulation on average 10 users create connections of the type cable tv1, 20 users are engaged in a video conference and another 20 users are using type cable tv2. The video conference connection was set up to be extremely bursty to increase modeling difficulty. The cable tv connection types are identical for the first 90 seconds. They are connection types that demand a constant bandwidth of 2 Mbps. After the first 200 seconds the cable tv2 connection type changes from a Constant Bit Rate (CBR) source into a Variable Bit Rate (VBR) source. It suddenly needs less bandwidth, but its peak requirements are more than the normal C-able tv1 connection.

As in experiment 2, the simulation parameters had to be changed extensively before the simulator could operate normally. These are shown below in Tables to 7 to 9:

TABLE 7

Burst Profile Experiment 3

| NAME | STATE | µ LEN | PCR | MCR | |
|---|---|---|---|---|---|
| Cable Tv1 | 1 | 90 | 2M | 2M | Constant Burst |
| Video Conference | 1 | 2 | 3M | 200K | |
| Cable Tv2 | 1 | 200 | 2M | 2M | Constant Burst |
|  | 2 | 200 | 3M | 100K | |

TABLE 8

Call Pattern Experiment 3

| NAME | µ DURATION | µ IAT |
|---|---|---|
| Cable Tv1 | 200 | 10 |
| Video Conference | 10 | 2 |
| Cable Tv2 | 300 | 10 |

TABLE 9

Traffic Profile Experiment 3

| NAME | µ CALLERS | START | STOP |
|---|---|---|---|
| Cable Tv1 | 10 | 0 | 7200 |
| Video Conference | 20 | 0 | 7200 |
| Cable Tv2 | 10 | 0 | 7200 |

Figure 14:
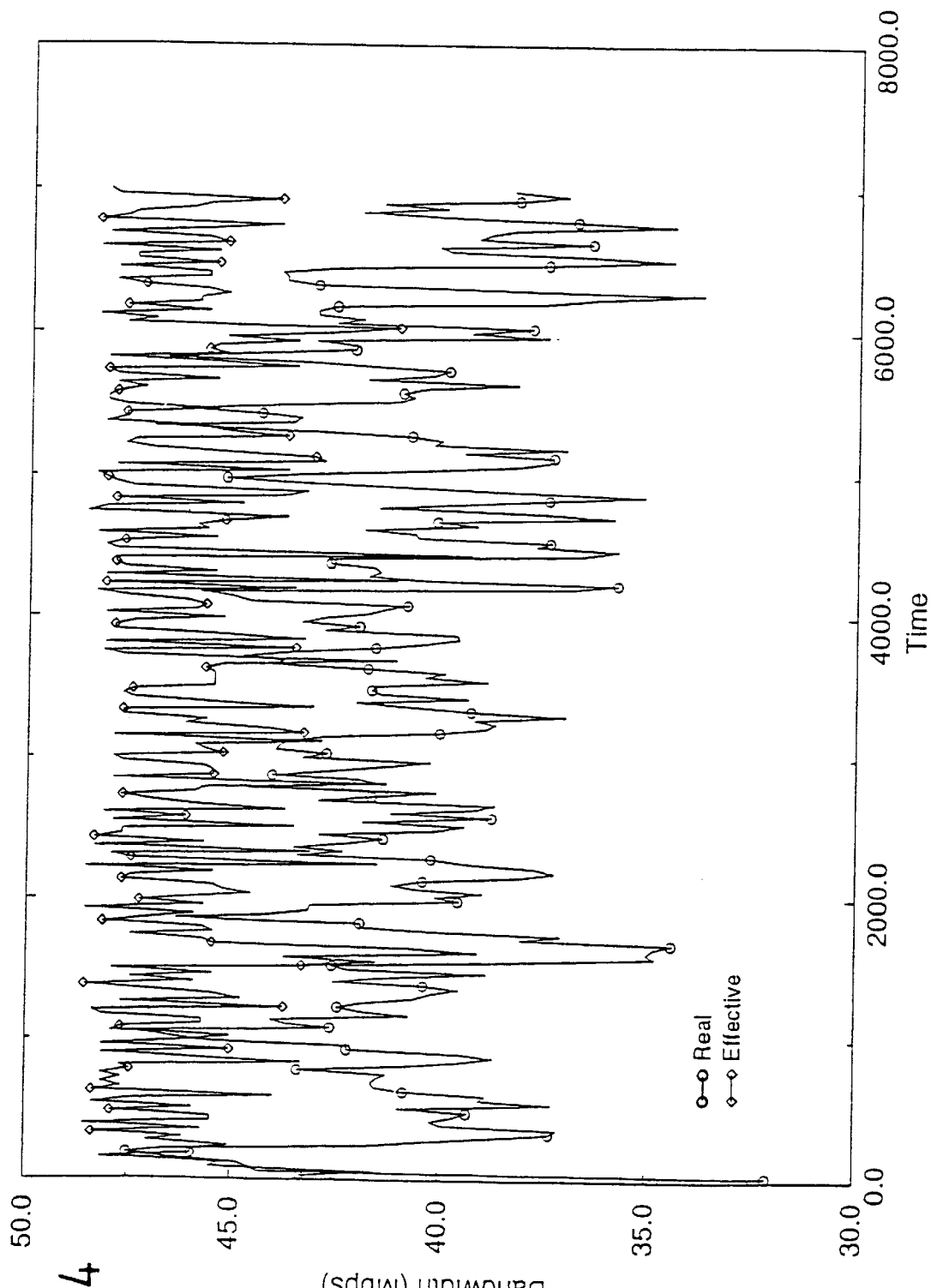
Figure 15:
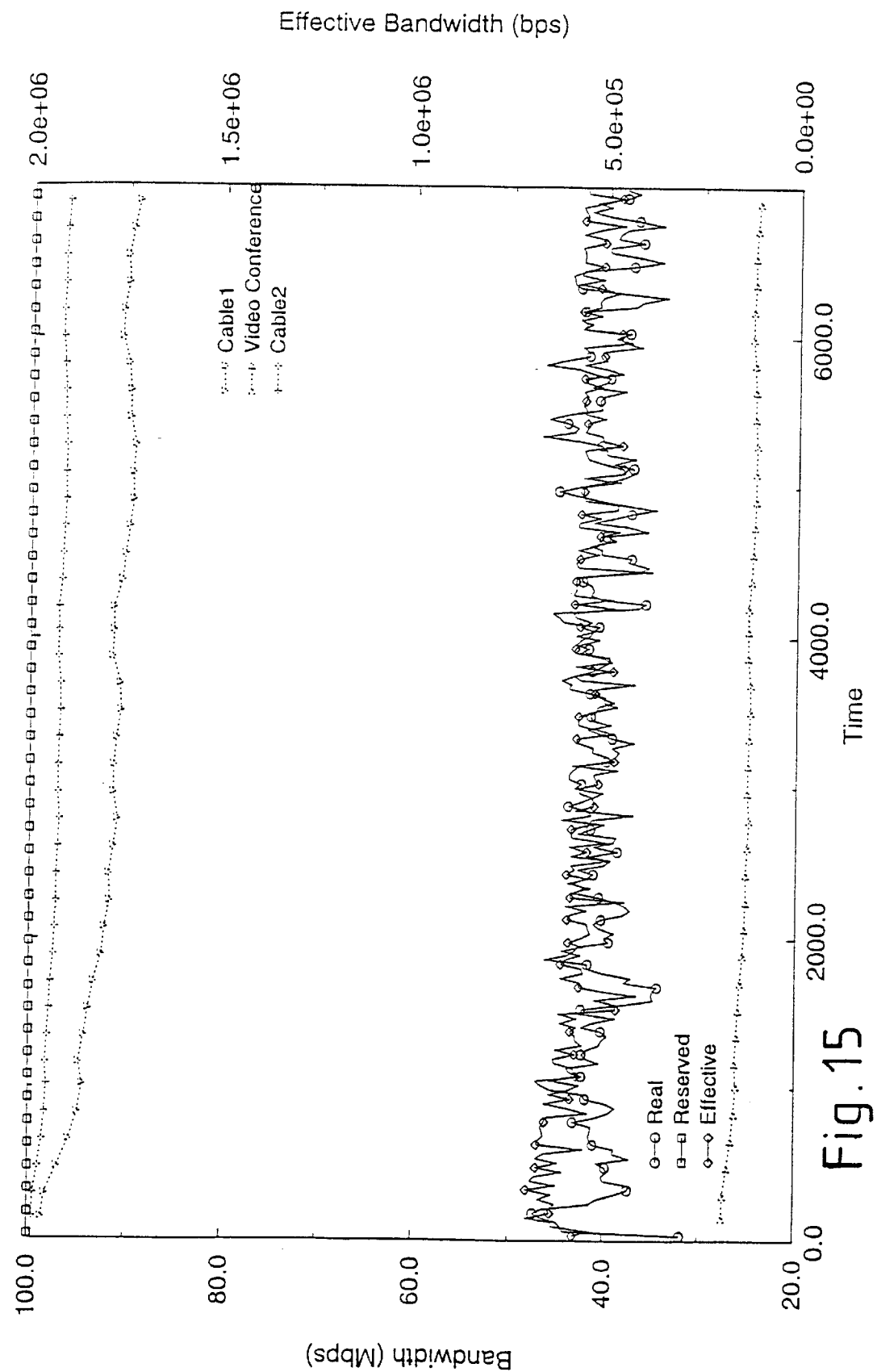
Figure 16:
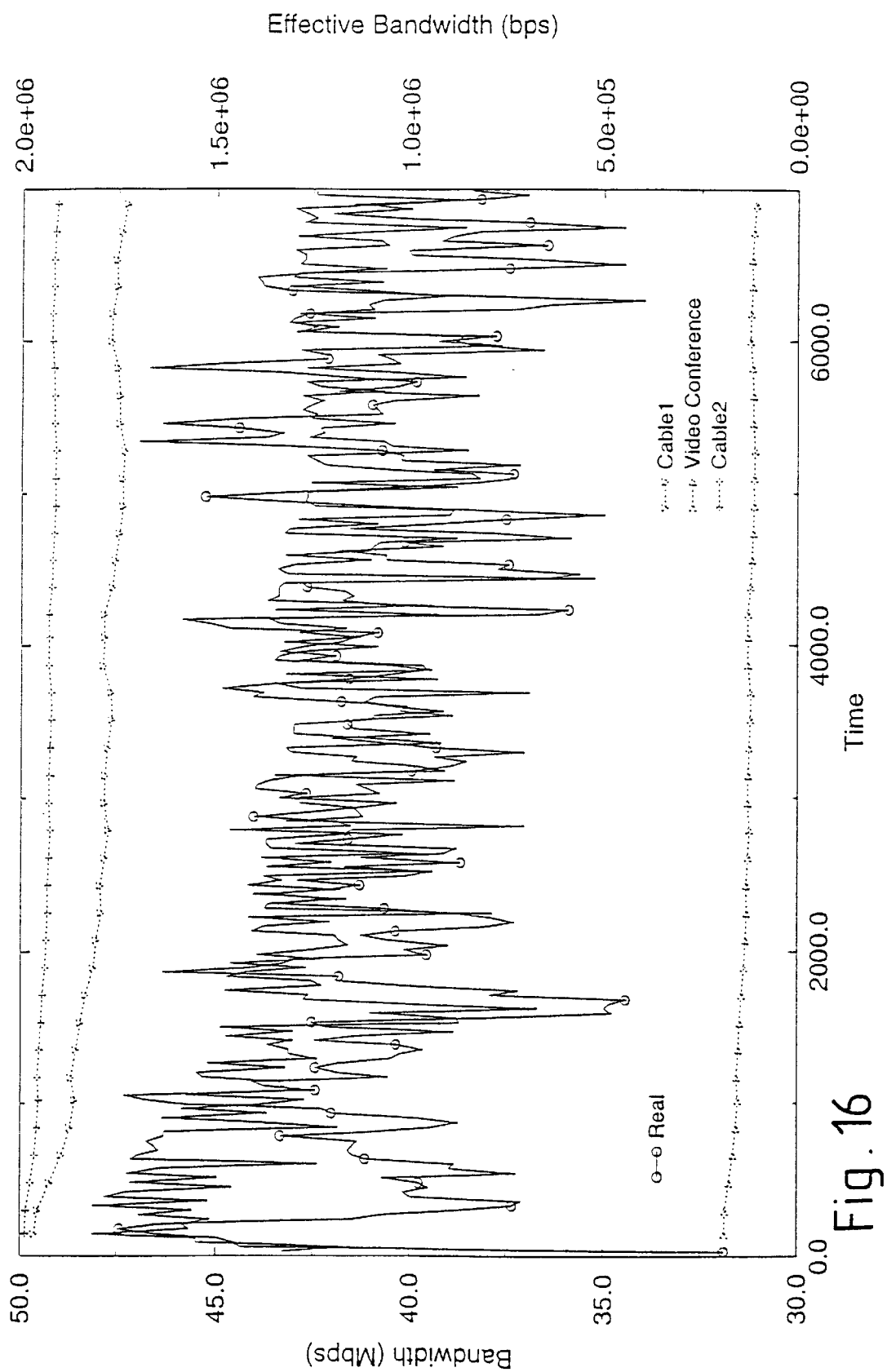
Figure 17:
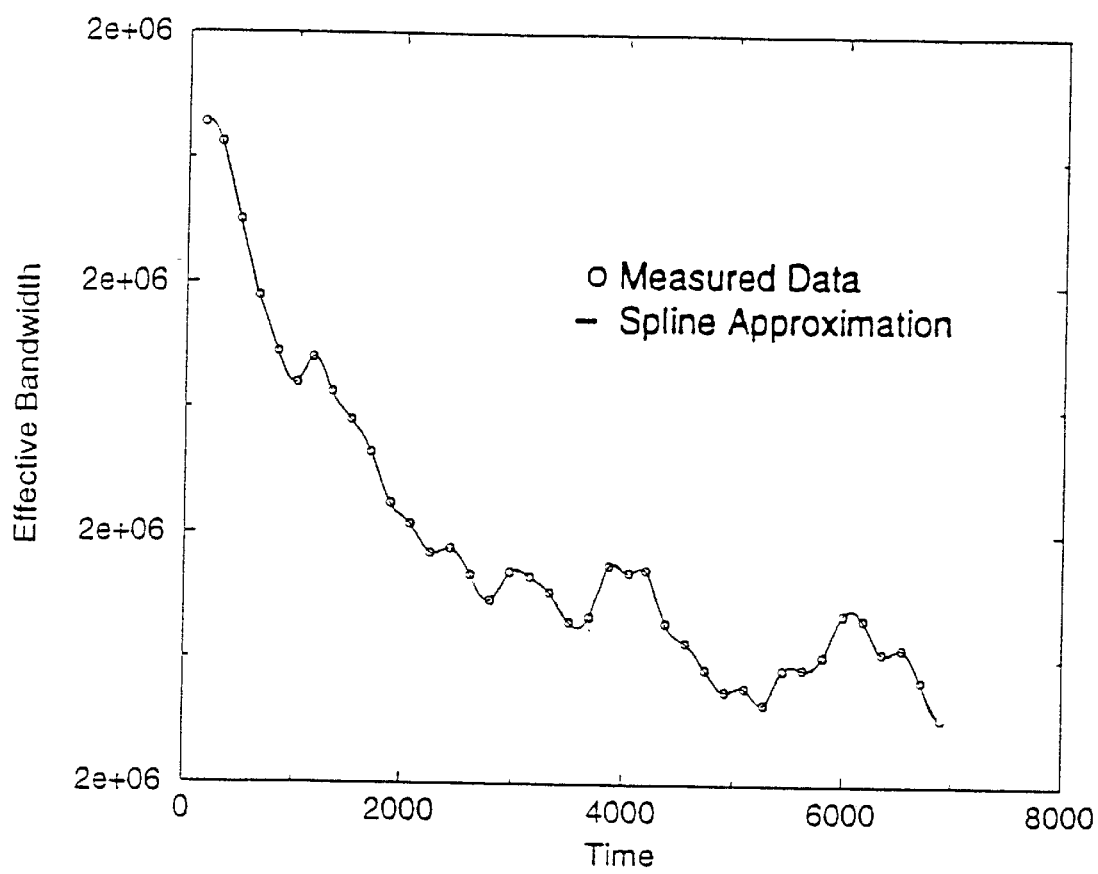

FIGS. 14 and 15 show the network simulation results without multi-layered CAC enabled. FIGS. 16 to 17 show the results for the case when the multi-layered CAC is enabled. As shown, the effective bandwidths of the connection types are slowly decreased to match the real bandwidth behaviour. FIG. 17 shows the clearest oscillating effective bandwidth—cable tv1. This representation has been made using a spline approximation function of the third layer CAC and clearly shows the oscillating, albeit converging, behaviour. Table 10 below shows a summary of the simulation results:

TABLE 10

| ITEM | CUMULATIVE MCAC | NO-MCAC |
|---|---|---|
| Reserved bandwidth | 23300 Mb | 23300 Mb |
| Real bandwidth | 9510.99 Mb | 9510.99 Mb |
| Effective bandwidth | 9874.99 Mb | 10766.28 Mb |
| Completed connections | 12203 | 12203 |
| Cells lost | 0 | 0 |

The experiments show that the adaptive CAC algorithm in the second layer functions correctly in that it is able to establish the surplus or deficit of a VPC and is able to modify the effective bandwidths of the connection types in an effort to optimize bandwidth usage. The theoretical links between the burstiness of sources and the effective bandwidth, the inter-arrival time and effective bandwidth have been established in experiments 1 and 2. Increased burstiness means an increased effective bandwidth, increased inter-arrival time means a decreased effective bandwidth. The adaptive heuristic approach to the modeling of traffic behaviour indicates that there is a valid alternative besides artificial intelligence techniques to the statistical traffic models. The adaptivity of the second layer CAC algorithm has been shown to cope with new services as the need arises.

What is claimed is:

1. A method of providing control of call acceptance in a node of a connection oriented communications network, comprising repeatedly modifying a connection admission control function of the node, after a time interval encompassing receipt of a plurality of new call connection requests, in dependence on a measurement of bandwidth utilisation of the node over an interval encompassing the plurality of new call connection requests, wherein the connection admission control function of the node implements an effective bandwidth scheme which allocates an amount of bandwidth to each of a number of connection types, and wherein one or more further connection admission control functions are responsive to traffic fluctuations to modify effective bandwidths for connection types stored by the node in a predetermined manner.

2. A method according to claim 1, in which the measurement of bandwidth utilization is made by the node.

3. A method according to claim 1, in which the measurement of bandwidth utilization is made at a network management level using computational resources of an associated management network.

4. A method according to claim 1, in which the measurement of bandwidth utilization is made over a first interval as part of a second layer connection admission control function.

5. A method of providing control of call acceptance in a node of a connection orientated communications network, comprising the step of:
periodically modifying a connection admission control function of the node in dependence on a measurement of bandwidth utilization of the node over an interval encompassing a number of call connections, characterised in that the connection admission control function of the node implements an effective bandwidth scheme which allocates an amount of bandwidth to each of a number of connection types and one or more further layer connection admission control functions are responsive to traffic fluctuations to modify effective bandwidths for connection types stored by the node in a predetermined manner;
wherein the measurement of bandwidth utilization is made over a first interval as part of a second layer connection admission control function; and
the measurement of bandwidth utilization is also made over a second, longer, interval as part of a third layer connection admission control function.

6. A method according to claim 1, in which the measurement of bandwidth utilization is used to determine a surplus or a deficit bandwidth which is subsequently distributed amongst the connection types in a predetermined manner.

7. A method according to claim 6, in which the distribution of bandwidth is on the basis of a mean bandwidth associated with each connection type.

8. A method of controlling acceptance of a call for a node in a communications network, the method comprising:
maintaining a sum of effective bandwidths for a number of connection types on a link;
monitoring the real bandwidth utilized by connections on the link over an interval encompassing a number of call connections;
determining a surplus bandwidth for the link;
periodically modifying the effective bandwidth allocated for each of the connection types by distributing the surplus bandwidth amongst the connection types in a predetermined manner after an interval encompassing receipt of a plurality of new call connection requests; and
accepting or refusing the call based on the effective bandwidth allocated for the connection type of the call.

9. A method according to claim 1, in which the communications network is an asynchronous transfer mode network.

10. A network management device for managing resources in a telecommunications network, the device comprising:
a monitor for measuring bandwidth utilization of an associated network node implementing an effective bandwidth type connection admission control function which allocates an amount of bandwidth to each of a number of connection types, the measurement of bandwidth utilization being made over an interval encompassing a number of call connections, and
a processor for implementing a connection admission management function based on the measured bandwidth utilization of the associated network node,
wherein the processor periodically modifies the connection admission control function of the node by modifying the effective bandwidths for connection types stored by the node in a predetermined manner after a time interval encompassing receipt of a plurality of new call connection requests.

11. A network management device according to claim 10, in which the processor comprises a memory storing executable instructions for determining a surplus or deficit bandwidth, distributing bandwidth amongst the connection types in a predetermined manner, and subsequently communicating changes in effective bandwidths to the network node.

12. A communications system characterised by a network node having a processor for implementing an effective bandwidth type connection admission control function which allocates an amount of bandwidth to each of a number of connection types, the communications system further comprising another processor to measure bandwidth utilization of the network node over an interval encompassing a number of call connections and periodically modify the connection admission control function of the node by modifying effective bandwidths for connection types stored by the node in a predetermined manner after a time interval encompassing receipt of a plurality of new call connection requests.

13. A communications system according to claim 12, comprising a management network which interfaces with a telecommunications network.

14. A communications system according to claim 13, in which the telecommunications network is an asynchronous transfer mode network.

15. A communications system comprising:
a network node having a processor for implementing an effective bandwidth type connection admission control function which allocates an amount of bandwidth to each of a number of connection types;
another processor to measure bandwidth utilization of the network node over an interval encompassing a number of call connections and periodically modify the connection admission control function of the node by modifying effective bandwidths for connection types stored by the node in a predetermined manner after a time interval encompassing receipt of a plurality of new call connection requests; and
a management network which interfaces with a telecommunications network;
wherein the management network comprises a number of memories encoded with executable instructions for monitoring bandwidth utilization over one or more intervals of different lengths and for causing a change in connection admission control function of the network node in dependence on the bandwidth utilization.

16. A communications system including processing means comprising a number of memories encoded with executable instructions for performing the following steps for providing control of call acceptance in a node of a connection oriented communications network:
repeatedly modifying a connection admission control function of the node, after a time interval encompassing receipt of a plurality of new call connection requests, in dependence on a measurement of bandwidth utilisation of the node over an interval encompassing the plurality of new call connection requests, wherein the connection admission control function of the node implements an effective bandwidth scheme which allocates an amount of bandwidth to each of a number of connection types, and wherein one or more further connection admission control functions are responsive to traffic fluctuations to modify effective bandwidths for connection types stored by the node in a predetermined manner.

17. A processing system comprising a number of memories encoded with a program of instructions for controlling a communications system characterised by a network node having a processor for implementing an effective bandwidth type connection admission control function which allocates an amount of bandwidth to each of a number of connection types, the communications system further comprising another processor to measure bandwidth utilization of the network node over an interval encompassing a number of call connections and periodically modify the connection admission control function of the node by modifying effective bandwidths for connection types stored by the node in a predetermined manner after a time interval encompassing receipt of a plurality of new call connection requests.

18. A method of providing control of call acceptance in a node of a connection oriented communications network, the method comprising:
   monitoring bandwidth utilization of a node over one or more intervals of different lengths, the intervals encompassing a number of call connections;
   periodically modifying a connection admission control function of the node based on the monitored bandwidth utilization after a time interval encompassing receipt of a plurality of new call connection requests; and
   allocating an amount of bandwidth to each of a number of connection types and wherein one or more further connection admission control functions are responsive to traffic fluctuations to modify effective bandwidths for connection types stored by the node in a predetermined manner.

19. A method of providing control of call acceptance in a node of a connection oriented communications network, the method comprising:
   measuring bandwidth utilization of the node over (i) a first interval as part of a second layer connection admission control function, and (ii) a second, longer, interval as part of a third layer connection admission control function;
   periodically modifying a connection admission control function of the node based on measurement of bandwidth utilization of the node after a time interval encompassing receipt of a plurality of new call connection requests; and
   allocating an amount of bandwidth to each of a number of connection types and wherein one or more further connection admission control functions are responsive to traffic fluctuations to modify effective bandwidths for connection types stored by the node in a predetermined manner.

20. A communications system for implementing control of call acceptance in a node of a connection oriented communications network, the system comprising:
   means for monitoring bandwidth utilization of a node over one or more intervals of different lengths, the intervals encompassing a number of call connections;
   means for periodically modifying a connection admission control function of the node based on the monitored bandwidth utilization after a time interval encompassing receipt of a plurality of new call connection requests; and
   means for allocating an amount of bandwidth to each of a number of connection types and wherein one or more further connection admission control functions are responsive to traffic fluctuations to modify effective bandwidths for connection types stored by the node in a predetermined manner.

21. A method of controlling acceptance of a call for a node in a communications network, the method comprising:
   monitoring bandwidth utilization over one or more intervals of different lengths wherein bandwidth used by connections on a link over an interval encompass a number of connections;
   maintaining a sum of effective bandwidths for a number of connection types on a link;
   periodically causing a change in connection admission control function of the network node based on bandwidth utilization after a time interval encompassing receipt of a plurality of new call connection requests; and
   modifying the effective bandwidth allocated for each of the connection types by distributing surplus bandwidth among the connection types in a predetermined manner.

22. A communications system for controlling acceptance of a call for a node in a communications network, the system comprising:
   a processor for implementing an effective bandwidth type connection admission control function which allocates an amount of bandwidth to each of a number of connection types; and
   a management network interfacing with the communications network, the management network having memories encoded with executable instructions for monitoring bandwidth utilization over one or more intervals of different lengths and for causing a change in connection admission control function of the node based on bandwidth utilization after a time interval encompassing receipt of a plurality of new call connection requests.

23. A method for controlling acceptance of a call for a node in a communications network, the method comprising:
   implementing an effective bandwidth type connection admission control function by allocating an amount of bandwidth to each of a number of connection types;
   monitoring bandwidth utilization over one or more intervals of different lengths; and
   causing a change in connection admission control function of the node based on bandwidth utilization after a time interval encompassing receipt of a plurality of new call connection requests.

24. A communications system comprising:
   a network node having a processor for implementing an effective bandwidth type connection admission control function which allocates an amount of bandwidth to each of a number of connection types, the processor measuring bandwidth utilization of the network node over an interval encompassing a number of call connections; and
   a management network which interfaces with a telecommunications network and which periodically modifies the connection admission control function of the node by modifying effective bandwidths for connection types stored by the node in a predetermined manner after a time interval encompassing receipt of a plurality of new call connection requests;
   wherein the management network comprises a number of memories encoded with executable instructions for monitoring bandwidth utilization over one or more intervals of different lengths and for causing a change in connection admission control function of the network node in dependence on the bandwidth utilization.

25. A communications system comprising:
a network node having a processor for implementing an effective bandwidth type connection admission control function which allocates an amount of bandwidth to each of a number of connection types, the processor measuring bandwidth utilization of the network node over an interval encompassing a number of call connections;
a management network which interfaces with a telecommunications network and which periodically modifies the connection admission control function of the node by modifying effective bandwidths for connection types stored by the node in a predetermined manner after a time interval encompassing receipt of a plurality of new call connection requests.

26. A communications system according to claim 26, in which the telecommunications network is an asynchronous transfer mode network.

27. A processor comprising a number of memories encoded with a program of instructions for controlling a system, the system comprising:
a network node having a processor for implementing an effective bandwidth type connection admission control function which allocates an amount of bandwidth to each of a number of Connection types, the processor measuring bandwidth utilization of the network node over an interval encompassing a number of call connections;
a management network which interfaces with a telecommunications network and which periodically modifies the connection admission control function of the node by modifying effective bandwidths for connection types stored by the node in a predetennined manner after a time interval encompassing receipt of a plurality of new call connection requests.

28. A method of providing control of call acceptance in a node of a connection oriented communications network, comprising:
storing an effective bandwidth amount in respect of each one of one or more connection types;
storing a number of calls in respect of each of the one or more connection types, indicative of the number of calls along a link connected to the node of each of the one or more connection types;
storing a maximum bandwidth in respect of the link;
upon receipt of a new call connection request requiring bandwidth on the link, summing the products of the stored effective bandwidth amounts and the stored number of calls in respect of each of the one or more connection types together with the stored effective bandwidth amount of the connection type of the new call connection request, comparing this sum with the stored maximum bandwidth in respect of the link and accepting the new connection request if the sum is less than the stored maximum bandwidth; and
at the expiry of each of a plurality of intervals, each of which encompasses a plurality of new call connection requests, recalculating and re-storing an effective bandwidth amount in respect of each of the one or more connection types, wherein the effective bandwidth amounts are re-calculated in dependence upon a measurement of bandwidth utilization of the node over an interval of time.

29. A method of providing control of call acceptance in a node of a connection oriented communications network, the method comprising repeatedly modifying a connection admission control function of the node, after a predetermined interval of time, the predetermined interval of time being independent of the receipt of individual new connection call requests but being of sufficient length that on average the predetermined interval encompasses a plurality of new call connection requests, in dependence on a measurement of bandwidth utilization of the node over an interval of time, wherein the connection admission control function of the node implements an effective bandwidth scheme which allocates an amount of bandwidth to each of a number of connection types, and one or more further connection admission control functions are responsive to traffic fluctuations to modify effective bandwidths for connection types stored by the node in a predetermined manner.

30. A method of providing control of call acceptance in a node of a connection oriented communications network, comprising:
storing an effective bandwidth amount in respect of each one of one or more connection types;
storing a number of calls in respect of each of the one or more connection types, indicative of the number of calls along a link connected to the node of each of the one or more connection types;
storing a maximum bandwidth in respect of the link;
upon receipt of a new call connection request requiring bandwidth on the link, summing the products of the stored effective bandwidth amounts and the stored number of calls in respect of each of the one or more connection types together with the stored effective bandwidth amount of the connection type of the new call connection request, comparing this sum with the stored maximum bandwidth in respect of the link and accepting the new connection request if the sum is less than the stored maximum bandwidth; and
at the expiry of each of a plurality of intervals, each of which is of a duration which is independent of the arrival of individual new connection call requests but is of sufficient length that on average the interval encompasses a plurality of new call connection requests, recalculating and re-storing an effective bandwidth amount in respect of each of the one or more connection types, wherein the effective bandwidth amounts are re-calculated in dependence upon a measurement of bandwidth utilization of the node over an interval of time.

31. A method of controlling acceptance of a call for a node in a communications network, the method comprising:
maintaining a sum of effective bandwidths for a number of connection types on a link;
monitoring the real bandwidth utilized by connections on the link over an interval encompassing a number of call connections;
determining a surplus bandwidth for the link;
periodically modifying the effective bandwidth allocated for each of the connection types by distributing the surplus bandwidth amongst the connection types in a predetermined manner, the periodic modification occurring at a time that is independent of receipt of new call connection requests; and
accepting or refusing the call based on the effective bandwidth allocated for the connection type of the call.

32. A network management device for managing resources in a telecommunications network, the device comprising:

a monitor for measuring bandwidth utilization of an associated network node implementing an effective bandwidth type connection admission control function which allocates an amount of bandwidth to each of a number of connection types, the measurement of bandwidth utilization being made over an interval encompassing a number of call connections, and a processor for implementing a connection admission management function based on the measured bandwidth utilization of the associated network node, wherein the processor periodically modifies the connection admission control function of the node by modifying the effective bandwidths for connection types stored by the node in a predetermined manner, the periodic modification occurring at a time that is independent of receipt of new call connection requests.

33. A communications system comprising:

a network node having a processor for implementing an effective bandwidth type connection admission control function which allocates an amount of bandwidth to each of a number of connection types, and another processor to measure bandwidth utilization of the network node over an interval encompassing a number of call connections and periodically modify the connection admission control function of the node by modifying effective bandwidths for connection types stored by the node in a predetermined manner, the periodic modification occurring at a time that is independent of receipt of new call connection requests.

34. A communications system comprising:

a network node having a processor for implementing an effective bandwidth type connection admission control function which allocates an amount of bandwidth to each of a number of connection types, the processor measuring bandwidth utilization of the network node over an interval encompassing a number of call connections; and a management network which interfaces with a telecommunications network and which periodically modifies the connection admission control function of the node by modifying effective bandwidths for connection types stored by the node in a predetermined manner, the periodic modification occurring at a time that is independent of receipt of new call connection requests.

35. A method of providing control of call acceptance in a node of a connection oriented communications network, the method comprising:

monitoring bandwidth utilization of a node over one or more intervals of different lengths, the intervals encompassing a number of call connections;

periodically modifying a connection admission control function of the node based on the monitored bandwidth utilization, the periodic modification occurring independent of receipt of new call connection requests; and allocating an amount of bandwidth to each of a number of connection types and wherein one or more higher layer connection admission control functions are responsive to traffic fluctuations to modify effective bandwidths for connection types stored by the node in a predetermined manner.

36. A communications system for controlling acceptance of a call for a node in the communications network, the system comprising:

a processor for implementing an effective bandwidth type connection admission control function which allocates an amount of bandwidth to each of a number of connection types; and a management network interfacing with the communications network, the management network having memories encoded with executable instructions for monitoring bandwidth utilization over one or more intervals of different lengths and for causing a change in connection admission control function of the node based on bandwidth utilization, the change occurring at a time that is independent of receipt of call connection requests received at the node.

* * * * *